United States Patent [19]
Norizuki et al.

[11] Patent Number: 5,764,234
[45] Date of Patent: Jun. 9, 1998

[54] TRAPEZOIDAL PARTITIONING METHOD AND APPARATUS THEREFOR

[75] Inventors: Masumi Norizuki; Masami Goto, both of Kawasaki, Japan; Martin Bouda, Duivendrecht, Netherlands

[73] Assignee: Fujitsu Limited, Kanagawa, Japan

[21] Appl. No.: 736,611

[22] PCT Filed: Mar. 17, 1994

[86] PCT No.: PCT/JP94/00433
§ 371 Date: Nov. 14, 1994
§ 102(e) Date: Nov. 14, 1994

[87] PCT Pub. No.: WO94/22037
PCT Pub. Date: Sep. 29, 1994

Related U.S. Application Data

[63] Continuation of Ser. No. 335,801, Nov. 14, 1994.

[30] Foreign Application Priority Data

Mar. 19, 1993 [JP] Japan .................................. 5-060033

[51] Int. Cl.$^6$ ...................................... G06T 11/60
[52] U.S. Cl. ...................................... 345/423
[58] Field of Search ...................... 395/123, 133, 395/134, 141; 345/423, 433, 434, 441

[56] References Cited

U.S. PATENT DOCUMENTS

| | | | |
|---|---|---|---|
| 5,014,223 | 5/1991 | Tanimori | 338/99 |
| 5,129,051 | 7/1992 | Cain | 395/133 |
| 5,133,049 | 7/1992 | Cain et al. | 395/133 |
| 5,335,319 | 8/1994 | Obata | 395/141 |

FOREIGN PATENT DOCUMENTS

| | | |
|---|---|---|
| 60-198723 | 10/1985 | Japan . |
| 61-248176 | 11/1986 | Japan . |
| 61-267096 | 11/1986 | Japan . |

OTHER PUBLICATIONS

The Layout Editor for Integrated Optics, "Integrated Optical Circuits with SIGRAPH–Optik", Siemens Nixdorf Informationsysteme AG, 1991.

BPM–CNET (ALCOR) A CAD tool for guided optics circuit design, France Telecom CNET Center Paris B, 1993.

T.P. Young et al., "Beamer–A Design Tool for Integrated Optics", GEC Journal of Research, vol. 6, No. 3, 1988, pp. 152–161.

(List continued on next page.)

Primary Examiner—Mark K. Zimmerman
Attorney, Agent, or Firm—Helfgott & Karas, PC.

[57] ABSTRACT

A trapezoidal partitioning method and apparatus for partitioning a figure of an optical waveguide approximated by a polygon into trapezoids wherein a prescribed linear axis is set, and the figure of the optical waveguide is partitioned by a group of straight lines passing through the vertices and lying perpendicular to the linear axis. Points of intersection at which two adjacent straight lines intersect the outline of the optical waveguide are adopted as vertices of one trapezoid, and vertex data is output as a set for each trapezoid. Further, the figure of the optical waveguide approximated by a polygon is specified by data of a sequence of vertices. In order to partition the figure of this optical waveguide into trapezoids, the prescribed linear axis is set, the figure of the optical waveguide is decomposed into convex polygons, along the direction of one axis, not having a concavity in the direction of the linear axis, and each decomposed convex polygon along the direction of the one axis is partitioned into trapezoids.

7 Claims, 20 Drawing Sheets

OTHER PUBLICATIONS

F. Cheng et al., "Covering of polygons by rectangles", Computer–Aided Design, vol. 21, No. 2, Mar. 1989, pp. 97–101.

R. Ismail et al., "Adaptive Meshing Schemes for Simulating Dopant Diffusion", IEEE Transactions on Computer–Aided Design of Integrated Circuits and Systems, vol. 9, No. 3, Mar. 1990, pp. 276–289.

W.M. Coughran et al., "Adaptive Grid Generation for VLSI Device Simulation", IEEE Transactions on Computer–Aided Design of Integrated Circuits and Systems, vol. 10, No. 10, Oct. 1991, pp. 1259–1275.

B. Dolsak et al., "Mesh generation expert system for engineering analyses with FEM", Computers in Industry, vol. 17, Nos. 2/3, pp. 309–315.

O.A. Mohammed et al., "3–D Finite Element Grid Generation In Electromagnetics" Proceedings–1990 Southeastcon, vol. 2, IEEE, pp. 684–687, Apr. 1990.

R.T. Farouki, "The approximation of non–degenerate offset surfaces", Computer Aided Geometric Design, vol. 3, No. 1, May 1986, pp. 15–43.

T. Havis, "Ending Computer Abuses by Mesh Generators", Machine Design, vol. 57, No. 7, Apr. 1985, pp. 115–118.

FIG. 12
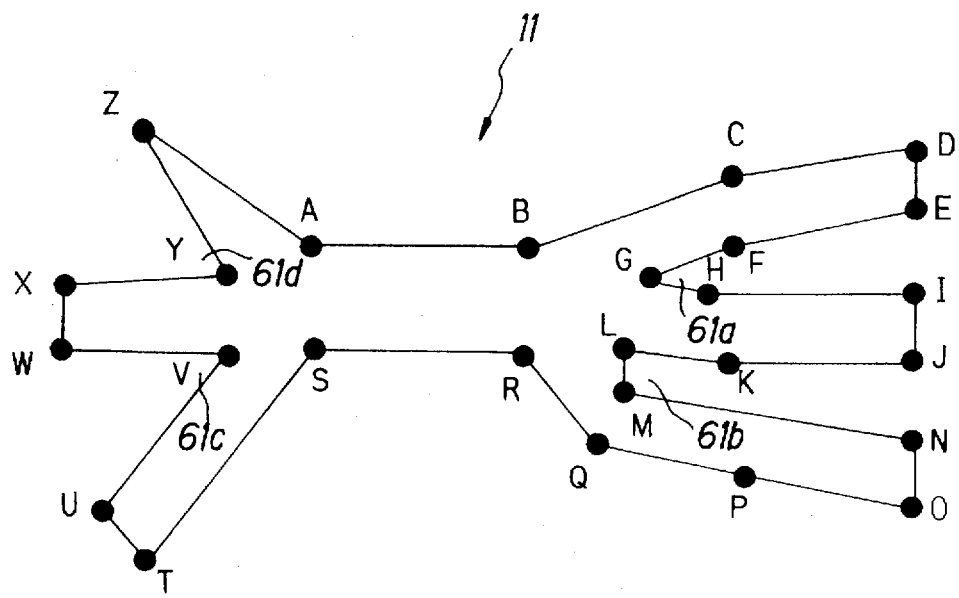
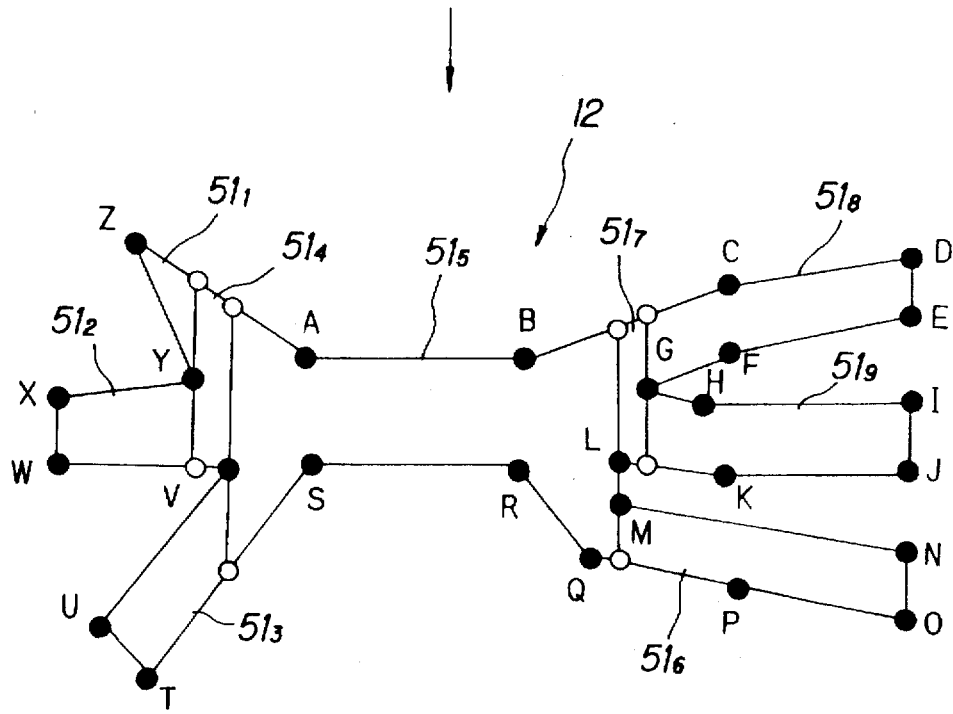

TRAPEZOIDAL PARTITIONING METHOD AND APPARATUS THEREFOR

This is a continuation, of application Ser. No. 08/335.801, filed Nov. 14, 1994.

TECHNICAL FIELD

This invention relates to a trapezoidal partitioning method and apparatus for partitioning the figure of an optical waveguide, which is approximated by a polygon, into trapezoids. More particularly, the invention relates to a trapezoidal partitioning method and apparatus suitable for application to a situation in which data indicative of the figure of an optical waveguide is converted into data having a format suited to a waveguide simulation, namely trapezoid-vertex data, after which this data is output.

BACKGROUND ART

It is not an exaggeration to say that the key to success in future optical communications for a time of more widespread use is how to efficiently develop optical devices and optical circuits with desired characteristics. To this purpose, it is necessary to provide an environment in which design, analysis and measurement/evaluation can be carried out systematically.

In the development of electronic devices and LSIs, such an environment has already been provided and separate, dedicated software for layout design, characteristic analysis and data extraction from prototype circuitry has already been established as a tool. Furthermore, systems have been constructed in which a developer is capable of designing the desired circuitry through an exchange of data with the tool. These systems are flourishing at the present time.

Meanwhile, attempts at simulating optical devices and optical waveguides systematically are also being carried out with vigor in advanced research facilities (see T. P. Young et al., "BEAMER A Design Tool for Integrated Optics", GEC Journal of Research, Vol. 6, No. 3, 1988). Further, easy-to-use individual tool packages for more widespread use of optical circuits have also begun appearing on the market. (For example, see R. Muller-Nawrath and R. Marz, "A Layout Editor for Integrated Optics", 19D2-2, IOOC '89, and M. Filoche et al., "Alcor Version 2.1 User Manual, 1992.)

At present, however, there are few examples which take into consideration the exchange of data with a tool, and tools for designing optical waveguides or tools for analyzing optical waveguides have merely been developed separately. This means, for example, that there is a need for an operation for converting output data from a tool for designing optical waveguides to data suited to a tool for analyzing optical waveguides. As a result, analytical simulation of an optical waveguide circuit of a complicated figure or of large scale is difficult to perform.

FIG. 24 is a general flowchart of optical-waveguide design.

First, the figure of the optical waveguide is put into the form of numerical values and these values are recorded as a data string (step 1). Next, the data string is used to simulate the characteristics of the optical waveguide (step 2). This simulation is repeated. After the desired characteristics are obtained, a photomask pattern is created based upon the data indicative of the figure of the optical waveguide (step 3). Next, a photomask for exposure purposes is created by the photomask pattern (step 4). Finally, the actual optical waveguide is formed using the exposure photomask (step 5).

Usually there are two methods available for creating the data string of step 1. The first method creates the figure of the optical waveguide by manual input. The second method creates the figure of the optical waveguide using a program dedicated to layout (a tool for designing optical waveguides), as described above. Since the simulation of waveguide characteristics at step 2 involves complicated computations, a program for optical-waveguide analysis (a tool for analyzing optical waveguides) is developed and executed by computer, as mentioned above.

With the input method performed manually, the quantity of numerical data indicative of figure is enormous. Consequently, a problem which arises is that the creation and entry of the data string require a major part of the time involved in designing the optical waveguide.

With the method using the program dedicated to layout, the time needed for creation can be reduced greatly in comparison with the manual operation. However, the structure of the output data resulting from the program dedicated to layout differs from the structure of the input data for simulating the waveguide characteristics at step 2. In other words, the program dedicated to layout uses a data array suited to the operation of the photomask creating equipment. This data array is not adjusted to a data array suited to, say, beam propagation method (BPM) used by the program which simulates the waveguide characteristics at step 2. As a consequence, it is required that the figure data of the optical waveguide created using the program dedicated to layout be converted to input data for simulating waveguide characteristics.

As for the input-data array of the program for simulation of waveguide characteristics, in many cases use is made of a method (a method of expressing trapezoidal-figure data) through which the figure of the optical waveguide is partitioned into trapezoids and expressed as a set of figure data of each individual trapezoid in such a manner that the figure of the optical waveguide undergoes a gradual change in the direction of light propagation. This method of expressing trapezoidal-figure data is such that a straight optical waveguide can be expressed by data representing one rectangle. However, a curved optical waveguide requires data indicative of a number of trapezoids.

In the case where use is made of the program dedicated to layout, as mentioned above, it is required that the figure data of the optical waveguide created by the program be converted to input data for simulating the waveguide characteristics. At the present time, however, a tool for performing the conversion automatically does not exist. In actuality, therefore, the conversion is performed by a manual operation. This detracts greatly from the efficiency at which optical waveguides may be designed.

In a graphics converting engine, a technique for decomposing an entered polygon into trapezoids and presenting the polygon on a display screen has been proposed. For example, see U.S. Pat. No. 5,129,051 "DECOMPOSITION OF ARBITRARY POLYGONS INTO TRAPEZOIDS".

However, the trapezoid partitioning method of this U.S. patent involves the trapezoidal partitioning of complicated figures wherein the sides of polygons which cannot exist in the figure of an optical waveguide intersect each other. For this reason the method is inefficient when applied to a case where the figure of an optical waveguide is partitioned into trapezoids. Further, this trapezoid partitioning method is limited to the painting of figures and its purpose is not the conversion of the figure of an optical waveguide to data for simulating waveguide characteristics. Furthermore, as illustrated in FIG. 25, the trapezoid partitioning method of this U.S. patent draws a group of parallel straight lines PL1, PL2, PL3 . . . through all vertices A~L of a polygon POL to partition the polygon POL into a number of trapezoidal areas (which include triangular areas). However, in the case of an optical-waveguide configuration which branches into a straight waveguide SLR and a curved waveguide NSLR, this method is such that even the straight waveguide (the hatched portion) SLR not requiring partitioning into trapezoids undergoes multiple partitioning. As a result, in a case where the method of this U.S. patent is executed by computer, a large-capacity memory for temporary storage of trapezoid coordinates is required. In addition, a file for storing the graphics data for simulation of optical waveguide characteristics finally created becomes large in scale. Moreover, since there is an increase in the number of trapezoids from partitioning, the time for simulating the waveguide characteristics is prolonged. Furthermore, the trapezoid partitioning method of this U.S. patent treats a polygonal figure as one mass when partitioning it into trapezoids. This means that if a polygon is complicated and has a large number of vertices, processing for sorting the vertices in conformity with the coordinate values becomes troublesome. Moreover, an operation for sorting the sides of the trapezoids in conformity with coordinate values is required in order to identify the trapezoids of waveguide portions from the trapezoids of non-waveguide portions. The time needed for such sorting processing is prolonged.

Accordingly, an object of the present invention is to provide a trapezoidal partitioning method and apparatus capable of being utilized when automatically converting figure data of an optical waveguide as created by a program dedicated to layout to input data for simulating waveguide characteristics of the optical waveguide.

Another object of the present invention is to provide a trapezoidal partitioning method and apparatus through which efficiency of optical-waveguide designing can be raised by exploiting the output data of a program dedicated to layout.

A further object of the present invention is to provide a trapezoidal partitioning method and apparatus in which even in the case of a figure which branches into a straight waveguide and a curved waveguide, the portion of the straight waveguide is not partitioned into trapezoids.

Yet another object of the present invention is to provide a trapezoidal partitioning method and apparatus in which when a polygon is a complicated one, the polygon is decomposed into a plurality of convex polygons along the direction of one axis and trapezoidal partitioning is applied to each convex polygon along the one axis, whereby processing for sorting vertices is executed in a short period of time and processing for sorting the sides of trapezoids is unnecessary.

SUMMARY OF THE INVENTION

The figure of an optical waveguide approximated by a polygon is specified by data of a sequence of vertices. In order to partition the figure of this optical waveguide into trapezoids, a prescribed linear axis is set, the figure of the optical waveguide is partitioned by a group of straight lines passing through the vertices and lying perpendicular to the linear axis. When two adjacent straight lines intersect the outline of the optical waveguide at two points each, each point of intersection is taken as being a vertex of a trapezoid and vertex data is output as a set for each trapezoid. In a case where two adjacent straight lines intersect the outline of the optical waveguide at 2·n (n≧2) points each, trapezoids corresponding to an optical waveguide portion and trapezoids corresponding to a non-optical waveguide portion are discriminated, and data of a sequence of vertices of the figure of the optical waveguide is converted to a set of data of a sequence of trapezoid vertices solely of the optical waveguide portion.

If this arrangement is adopted, figure data of an optical waveguide that has been created by a program dedicated to layout can be converted automatically to input data for simulating the characteristics of the optical waveguide. The efficiency at which optical waveguides are designed can be improved upon by exploiting the output data of the program dedicated to layout.

Further, the figure of an optical waveguide approximated by a polygon is specified by data of a series of vertices. In order to partition the figure of this optical waveguide into trapezoids, a prescribed linear axis is set, the figure of the optical waveguide is decomposed into convex polygons, along the direction of one axis, not having a concavity in the direction of the linear axis, and each decomposed convex polygon along the direction of the one axis is partitioned into trapezoids having two, first and second, sides perpendicular to the linear axis. If this arrangement is adopted, even when the figure is such that a straight waveguide and a curved waveguide branch from each other, the straight waveguide portion is not partitioned into trapezoids. Further, even if a polygon is a complicated one, the polygon is decomposed into a plurality of convex polygons along the direction of the one axis and trapezoidal partitioning is applied to each convex polygon along the one axis. As a result, processing for sorting vertices is executed in a short period of time and processing for sorting the sides of trapezoids can be dispensed with, thus making it possible to shorten processing time.

BRIEF DESCRIPTION OF THE DRAWINGS

FIG. 12 is a diagram (part 1) for describing a third embodiment;

BEST MODE FOR CARRYING OUT THE INVENTION

(a) Overview of the invention

FIG. 1 is a diagram for describing an overview of the present invention.

Figure 1A:
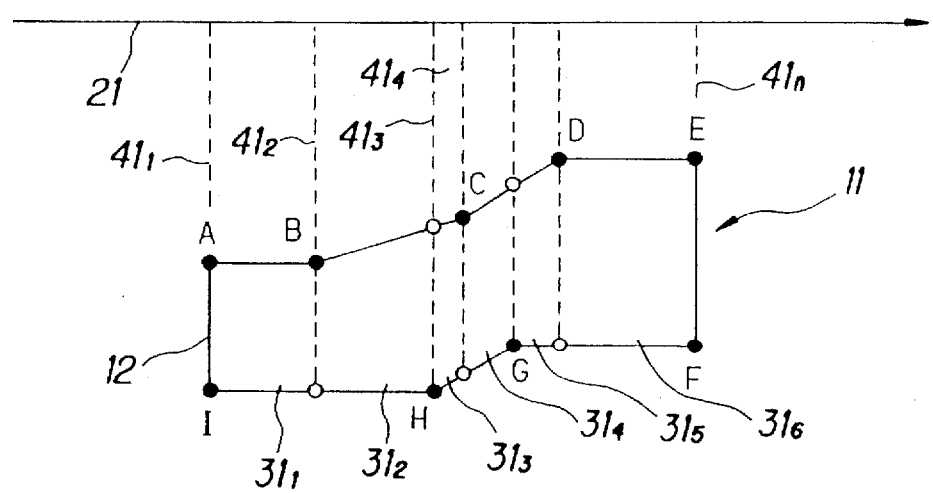
FIGS. 1(a), (b) are diagrams for describing the principles of the present invention.

In FIG. 1(a), numeral 11 denotes the figure of an optical waveguide approximated by a polygon, 21 a prescribed linear axis, namely a linear axis (the Z axis, for example) set in the direction of light propagation so as to lie perpendicular to the end facet for an incident optical beam 12 of the optical waveguide, and $31_i$ (i=1, 2, ...) a group of trapezoids for a case where the figure of the optical waveguide is partitioned into trapezoids.

Figure 1B:
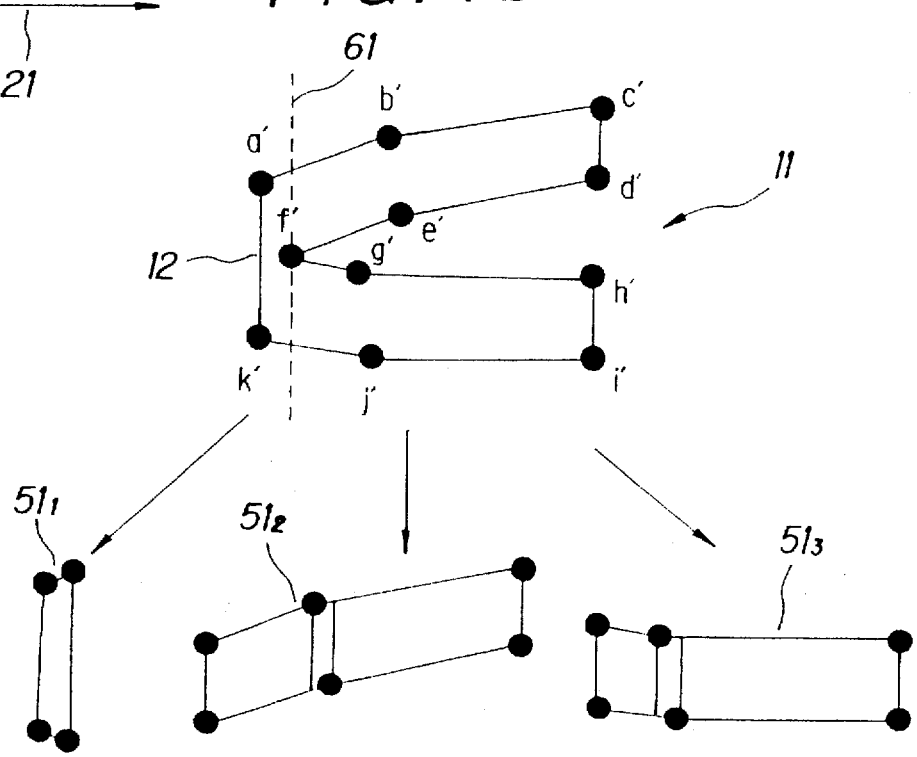
Figure 11:
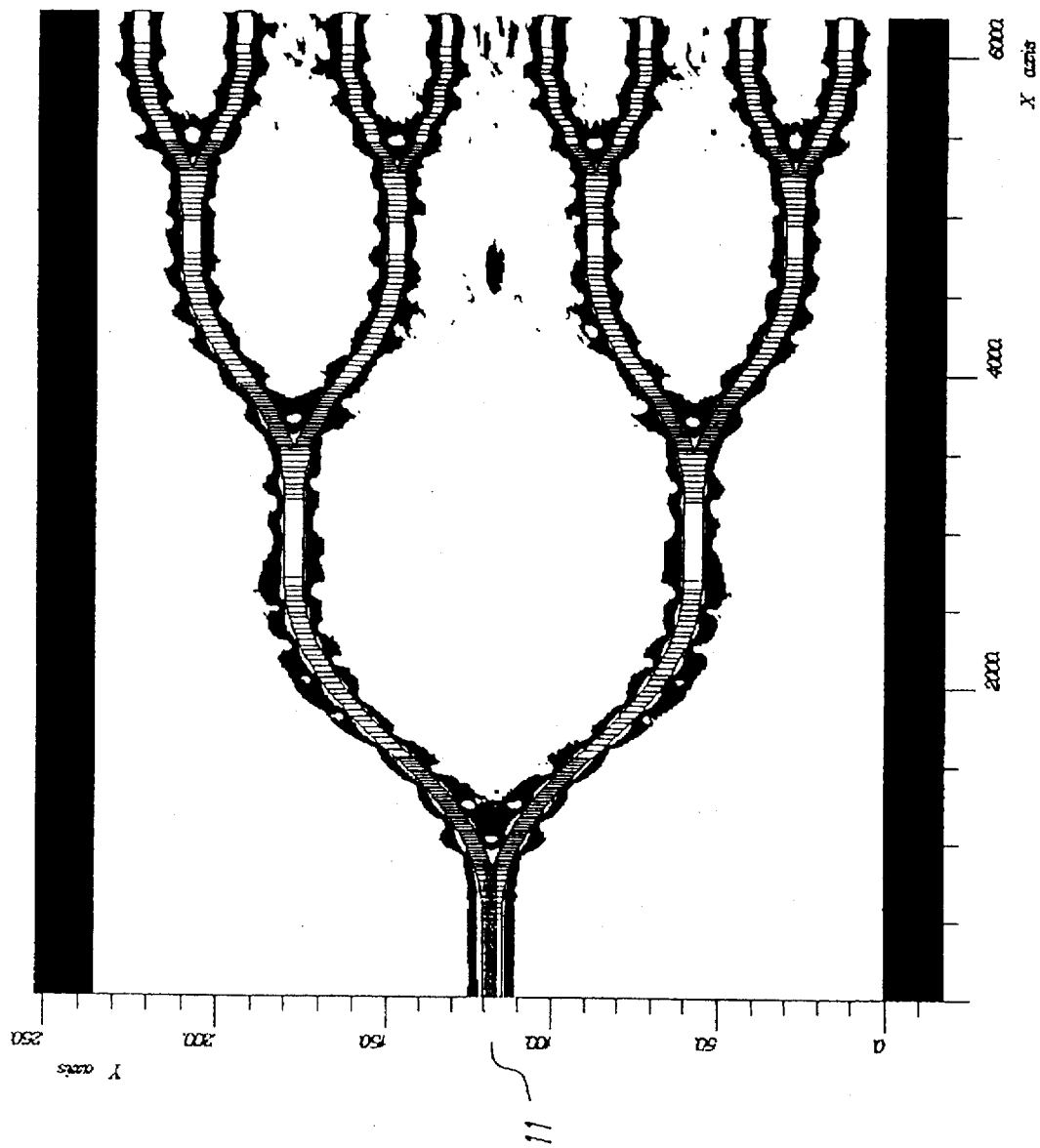
FIG. 11 is a diagram for describing the results of simulating waveguide characteristics.

In FIG. 1(b), 11 denotes the figure of the optical waveguide approximated by a polygon, 21 the linear axis (the Z axis) set so as to lie perpendicular to the end facet for an incident optical beam 12 of the optical waveguide, and $51_i$ (i=1, 2, 3) convex polygons, along the direction of the one axis, not having a concavity in the direction of the linear axis.

The FIG. 11 of the optical waveguide approximated by the polygon is specified by data of a sequence of vertices A, B, ..., I. In order to partition the FIG. 11 of this optical waveguide into trapezoids, the prescribed linear axis 21 is set, the FIG. 11 of the optical waveguide is partitioned by a group of straight lines $41_i$ (i=1, 2, ...) passing through the vertices A, B, ..., I and lying perpendicular to the linear axis 21. When two adjacent straight lines $41_i$, $41_{i+1}$ intersect the outline of the optical waveguide at two points each, each point of intersection is taken as being a vertex of a trapezoid $31_i$ and vertex data is output as a set for each trapezoid. Though the trapezoids have two (first and second) sides perpendicular to the linear axis 21, included as a special case is a triangle in which two adjacent vertices of a trapezoid coincide on the first or second side.

In a case where two adjacent straight lines $41_i$, $41_{i+1}$ each intersect the outline of the optical waveguide at 2·n (n≧2) points, trapezoids corresponding to an optical waveguide portion and trapezoids corresponding to a non-optical waveguide portion are discriminated, and data of a sequence of vertices of the figure of the optical waveguide is converted to a set of data of a sequence of trapezoid vertices solely of the optical waveguide portion.

If this arrangement is adopted, figure data of an optical waveguide that has been created by a program dedicated to layout can be converted automatically to input data for simulating the waveguide characteristics of the optical waveguide. The efficiency at which optical waveguides are designed can be improved upon by exploiting the output data of the program dedicated to layout.

Further, the FIG. 11 of the optical waveguide approximated by the polygon is specified by data of a sequence of vertices a', b', ..., k'. In order to partition the FIG. 11 of this optical waveguide into trapezoids, the prescribed linear axis 21 is set, the FIG. of the optical waveguide is decomposed into convex polygons $51_1$, $51_2$, $51_3$, along the direction of one axis, not having a concavity in the direction of the linear axis, and each decomposed convex polygon along the direction of the one axis is partitioned into trapezoids having two (first and second) sides perpendicular to the linear axis. The processing for decomposing a convex polygon along the direction of one axis includes obtaining a vertex (internal cusp) f' of a concave portion in the direction of the linear axis 21 in the FIG. of the optical waveguide using the vertex-sequence data of the FIG. 11 of the optical waveguide, and decomposing the FIG. 11 of the optical waveguide into the convex polygons $51_1$, $51_2$, $51_3$ along the direction of one axis by a straight line 61 passing through the internal cusp and lying perpendicular to the linear axis 21.

If this arrangement is adopted, even when the Figure is such that a straight waveguide and a curved waveguide branch from each other, the straight waveguide portion is not partitioned into trapezoids. Further, even if a polygon is a complicated one, the polygon is decomposed into a plurality of convex polygons along the direction of the one axis and trapezoidal partitioning is applied to each convex polygon along the one axis. As a result, processing for sorting vertices is executed in a short period of time. Moreover, processing for sorting the sides of trapezoids can be dispensed with, thus making it possible to shorten processing time.

Figure 2:
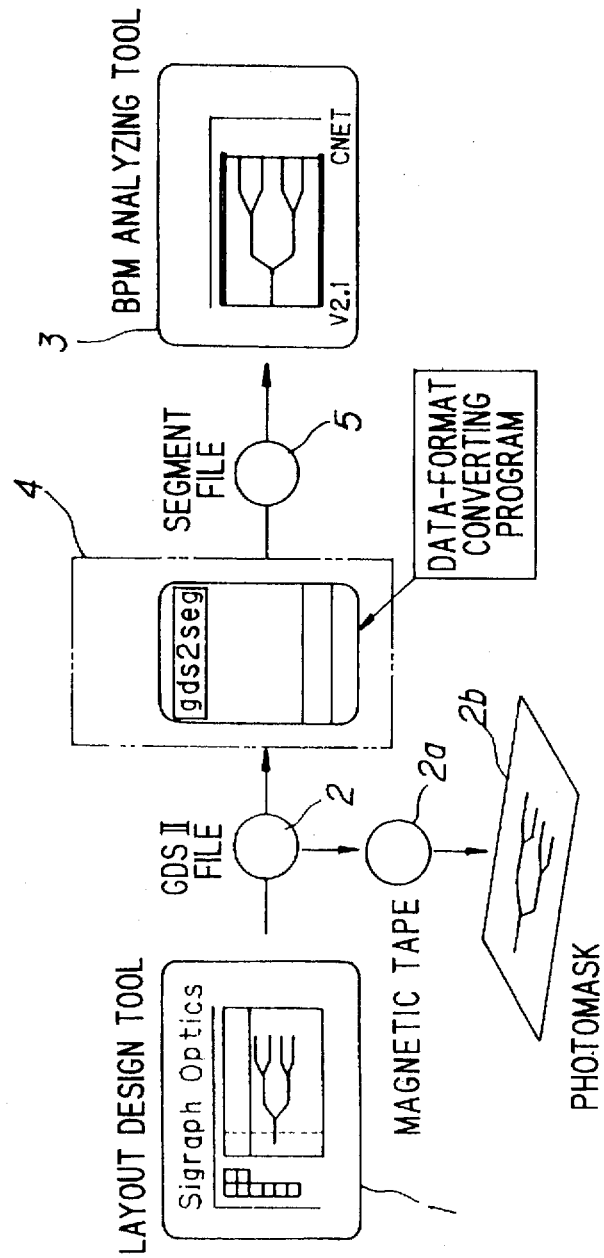
FIG. 2 is a diagram showing the configuration of a system for designing and analyzing an optical waveguide circuit.
Figure 3:
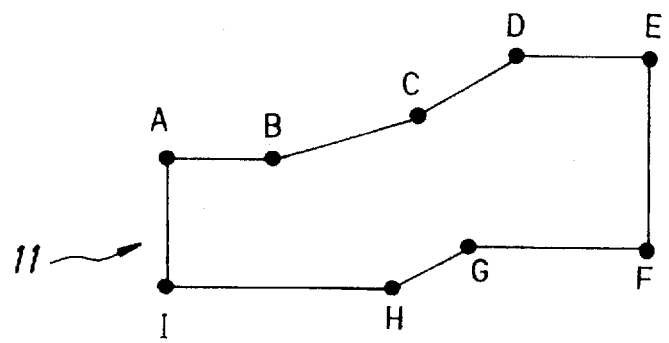
FIG. 3 is a diagram for describing an example of the figure of an optical waveguide created by a program dedicated to layout as well as an approximation of polygon vertices.

(b) Configuration of system for designing and analyzing optical waveguide circuit FIG. 2 is a diagram showing the configuration of a system for designing and analyzing an optical waveguide circuit. Numeral 1 denotes a CAD tool dedicated to layout of a waveguide circuit. This is made of the Sigraph-Optic V3.0, manufactured by Siemens Niksdorf, which has provided good results in Europe. The CAD tool 1 dedicated to layout outputs a graphics data file 2 by a GDS II format standardized for creation of a photomask. More specifically, the optical waveguide 11 is approximated by a polygon, as shown in FIG. 3, and the coordinate values of vertices A, B, ..., I constructing the polygon displayed and output upon being arrayed in order in the clockwise direction. Numeral 2a denotes a magnetic tape for storing the graphics data file, and 2b represents a photomask created from the graphics data file. Though a case in which the vertices A, B, ..., I are arrayed clockwise is illustrated in the example described above, these vertices may of course be arrayed in the counter-clockwise direction.

Figure 4:
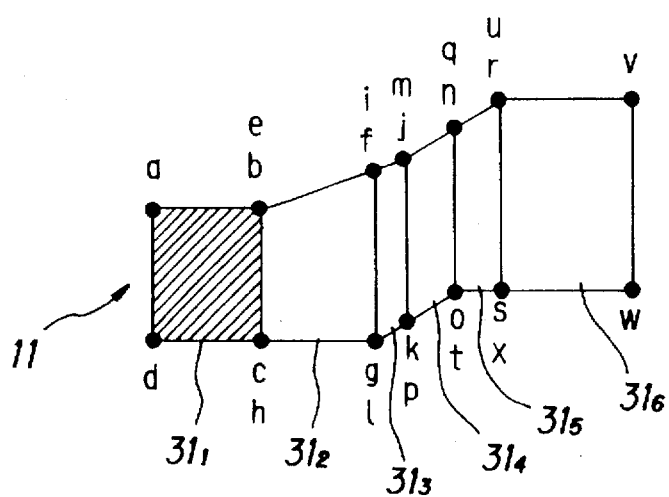
FIG. 4 is a diagram for describing a group of trapezoids, which are necessary for entry for simulation of waveguide characteristics, as well as a sequence of vertices of the trapezoids.

A tool 3 for analyzing optical waveguides is, by way of example, the BPM-CNET/Alcor V2.1, manufactured by France Telecom, for simulating waveguide characteristics (for obtaining the waveguide characteristics) by BPM (the beam propagation method). The tool 3 for analyzing optical waveguides uses its own segment file (partition file) format suited to the features of the optical waveguide for the purpose of entering the graphics information of interest. That is, the tool partitions the FIG. 11 of the optical waveguide into trapezoids $31_1, 31_2, 31_3, \ldots 31_6$, as shown in FIG. 4, in such a manner that the FIG. of the optical waveguide 11 will change gradually in the direction of light propagation, and employs sets of vertex data a, b, c, d; e, f, g, h; i, j, k, 1; . . . ; u, v, w, x of the respective trapezoids as data specifying the FIG. 11 of the optical waveguide. In general, points constructing a trapezoid are shared by a plurality of trapezoids. For example, points b, e and the same points, points c and h are the same points, and so forth.

Numeral 4 designates a data format-conversion tool according to the present invention for converting photomask-creating CAD data (data indicative of the sequence of vertices of the optical waveguide approximated by a polygon), which has been output by the CAD tool 1 dedicated to layout, to data (data indicative of the sequence of trapezoid vertices) for BPM simulation input. Numeral 5 denotes a segment file composed of a set of data indicative of a sequence of trapezoid vertices.

Figure 5A:
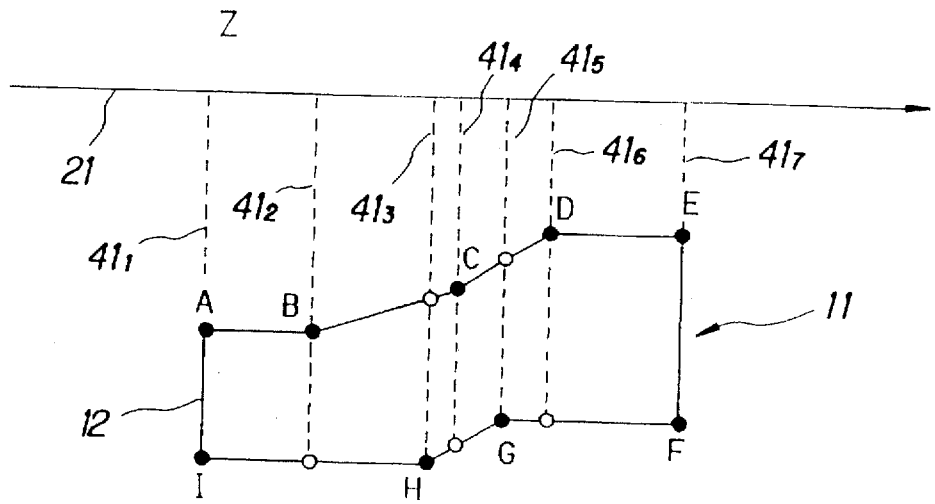
FIGS. 5(a), (b), (c) are diagrams for describing the partitioning (according to a first embodiment) of a figure by Z-axis intercept lines passing through the vertices of a polygon.
Figure 5B:
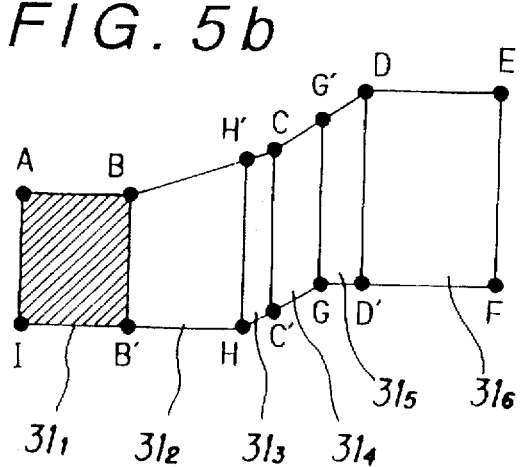

(c) First Embodiment of Method of Trapezoidal Partitioning According to the Invention FIG. 5 is a diagram for describing a first embodiment of trapezoidal partitioning according to the present invention. Numeral 11 denotes the FIG. of an optical waveguide approximated by a polygon. The coordinates (vertex-sequence data) of the vertices A, B, . . . , I of the approximating polygon are output in order in the clockwise or counter-clockwise direction by the CAD tool 1 dedicated to layout. Numeral 21 denotes the prescribed linear axis, namely a linear axis (the Z axis, for example) set in the direction of light propagation so as to lie perpendicular to the end facet for an incident optical beam 12 of the optical waveguide, $31_i$ (i=1, 2, . . . ) the group of trapezoids for a case where the FIG. of the optical waveguide is partitioned into trapezoids, and $41_i$ (i=1, 2, . . . ) the group of straight lines passing through the vertices A, B, . . . , and lying perpendicular to the linear axis 21.

In order to partition the FIG. 11 of the optical waveguide into trapezoids, the linear axis (Z axis) 21 is set in the direction of light propagation so as to lie perpendicular to the end facet for an incident optical beam 12 of the optical waveguide, and the FIG. 11 of the optical waveguide is partitioned by the group of straight lines $41_i$ (i=1, 2, . . . ) passing through the vertices A, B, . . . , I and lying perpendicular to the linear axis 21.

Among the points of intersection between two adjacent straight lines $41_i$, $41_{i+1}$ and the outline of the optical waveguide, points of intersection [the white circles in FIG. 5(a)] other than vertices [the black circles in FIG. 5(a)] are computed. Next, the coordinates of the vertices (A, B, B', I) of the first trapezoid $31_1$ from the left side are output as a set, then the coordinates of the vertices (B, H', H, B') of the second trapezoid $31_2$ from the left side are output as a set. Thereafter, and in similar fashion, the coordinates of the vertices (D, E, F, D') of the last trapezoid are eventually output as a set.

Figure 5C:
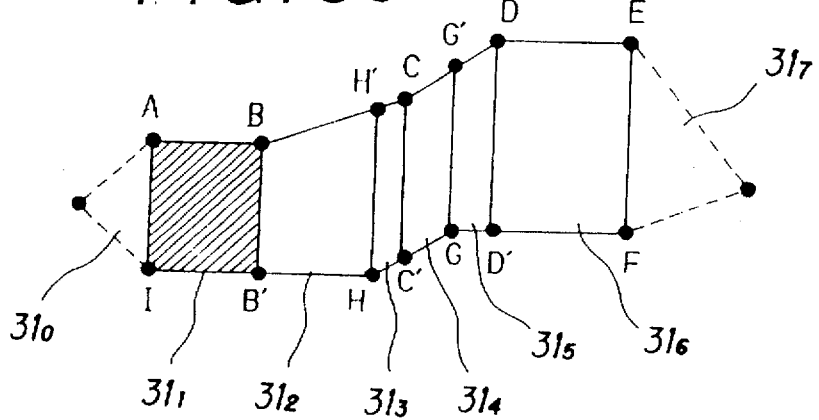

Though the trapezoids have two (first and second) sides perpendicular to the linear axis 21, included as a special case are triangles $31_0, 31_7$ in each of which two adjacent vertices on the first or second side of a trapezoid coincide, as indicated by the dashed lines in FIG. 5(c).

Figure 6:
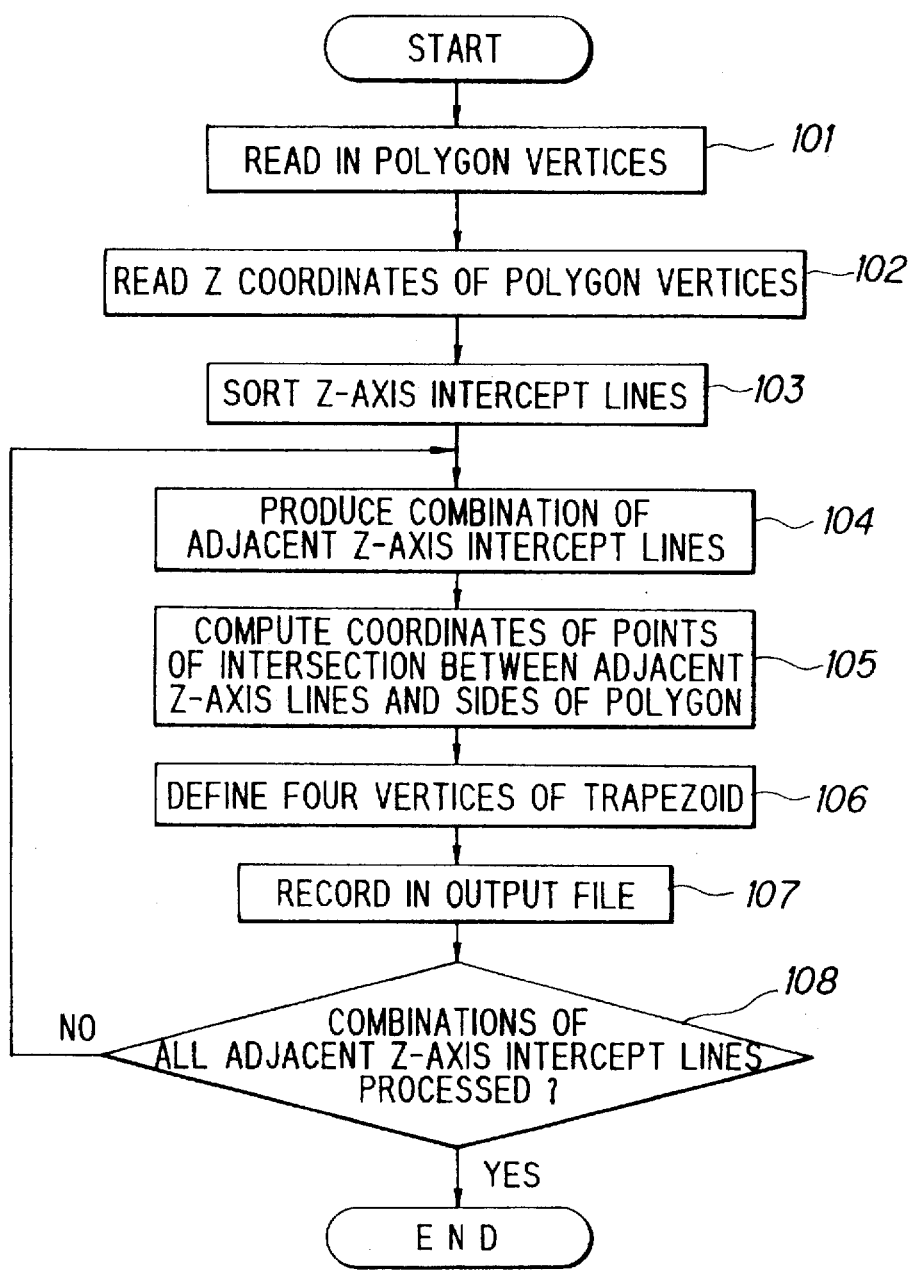
FIG. 6 is a processing flowchart of trapezoidal partitioning according to the first embodiment.

FIG. 6 is a flowchart of processing for trapezoidal partitioning according to the first embodiment.

Data indicative of the FIG. of an optical waveguide output by the CAD tool 1 dedicated to layout and stored on a memory medium is read in (step 101). It should be noted that the FIG. 11 of the optical waveguide is approximated by a polygon and that the coordinates (vertex-sequence data) of the vertices A, B, . . . , I constructing the polygon have been stored on the memory medium in order in the clockwise direction. Further, the coordinate axes are such that the Z axis is set as the direction of light propagation and the X axis is set perpendicular to the Z axis.

Next, the Z-axis coordinate of each vertex of the polygon is read (step 102) and the Z coordinates are sorted in ascending order (step 103). That is, the group of straight lines (Z-axis intercept lines) $41_i$ (i=1, 2, . . . ) passing through the vertices A, B, C, . . . , I of the polygon and lying perpendicular to the Z axis are sorted in ascending order of the Z-axis coordinates.

Thereafter, one combination of two adjacent Z-axis intercept lines is produced (step 104) and the coordinates of points of intersection between these two adjacent Z-axis intercept lines and the outline of the polygon (the sides of the polygon) are computed (step 105). That is, among the points of intersection between two adjacent straight lines $41_i$, $41_{i+1}$ and the outline of the optical waveguide, points of intersection [the white circles in FIG. 5(a)] other than vertices [the black circles in FIG. 5(a)] are computed.

Next, the coordinates of the vertices (A, B, B', I) of the first trapezoid $31_1$ are made a set (step 106) and the coordinates of these four vertices are recorded in an output file as the trapezoid vertices of the first trapezoid (step 107). This is followed by checking to see whether processing has been applied to the combinations of all adjacent Z-axis intercept lines (step 108). If processing has not been completed, then the processing from step 104 onward is executed for the next adjacent Z-axis intercept lines. Trapezoid vertices are recorded in the output file for the combination of all adjacent Z-axis intercept lines.

If this arrangement is adopted, Figure data of an optical waveguide that has been created by a program dedicated to layout can be converted automatically to input data for simulating the waveguide characteristics of the optical waveguide. The efficiency at which optical waveguides are designed can be improved upon by exploiting the output data of the program dedicated to layout.

Figure 7A:
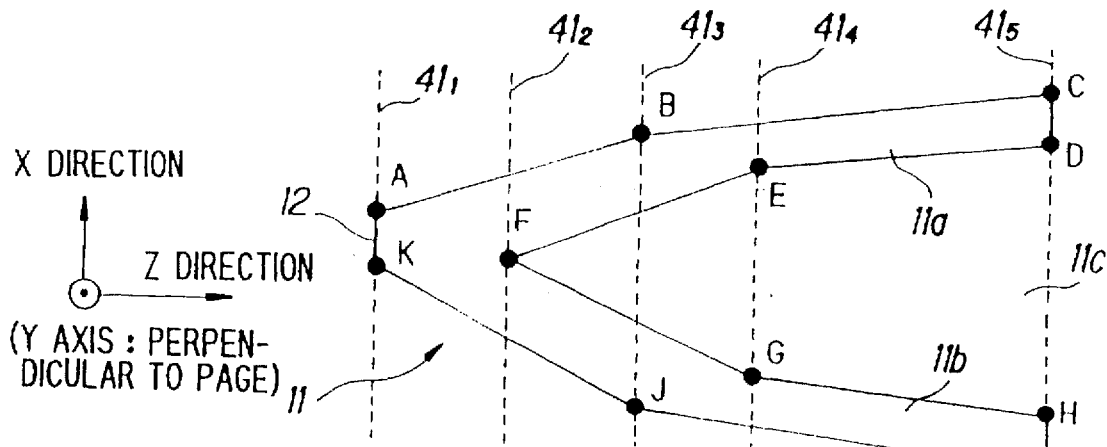
FIGS. 7(a), (b), (c) are diagrams for describing a technique (according to a second embodiment) for converting data indicative of the figure of an optical waveguide.
Figure 7B:
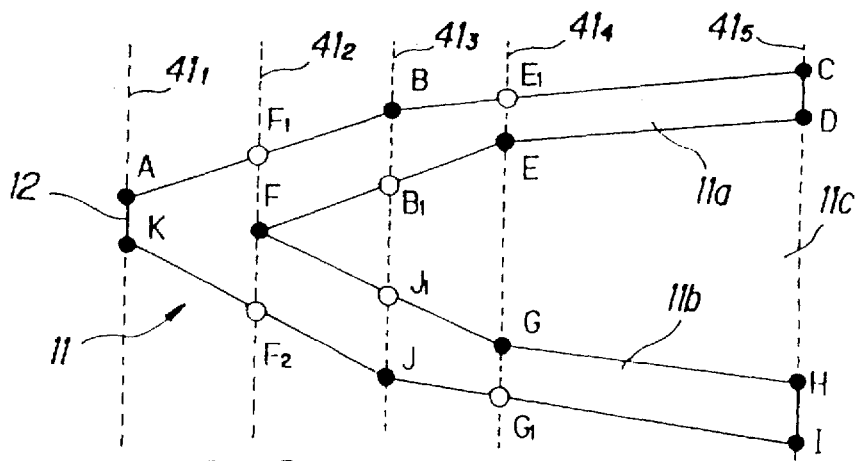
Figure 7C:
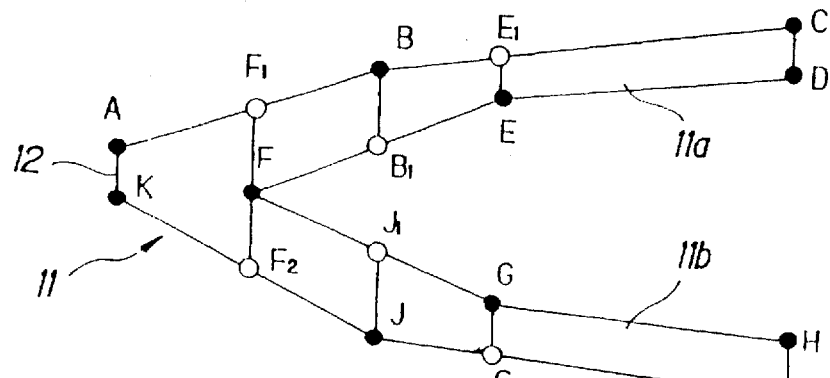

(d) Second Embodiment of Method of Trapezoidal Partitioning According to the Invention In the first embodiment, a case is illustrated in which the two adjacent straight lines $41_i$, $41_{i+1}$ each intersect the outline of the optical waveguide at two points. In general, however, each line intersects the outline at 2·n (n≧2) points. FIG. 7 shows an example of an optical waveguide in such case. This is an example in which the optical waveguide 11 branches into two portions. There are n branches, depending upon the optical waveguide. As evident from FIG. 7, the Z-axis intercept lines $41_3, 41_4, 41_5$ intersect the sides of the polygon at 2·n (=4) points. In such case, it is necessary to distinguish the optical waveguide portions 11a, 11b from a non-optical waveguide portion 11c and output the trapezoid vertices solely of the optical waveguide portions. In other words, it is unnecessary to output the coordinates of the four vertices of each of the trapezoids $FB_1J_1$ (this is a triangle because adjacent vertices of the trapezoid coincide), $B_1EGJ_1$ and EDHG in the non-optical waveguide 11c.

Thus, in a case where the adjacent straight lines $41_i$, $41_{i+1}$ each intersect the outline of the optical waveguide at 2·n ($n \geq 2$) points, processing for excluding the trapezoids of the non-optical waveguide is required.

(d-1) Control of Trapezoidal Partitioning According to the Second Embodiment

Figure 8:
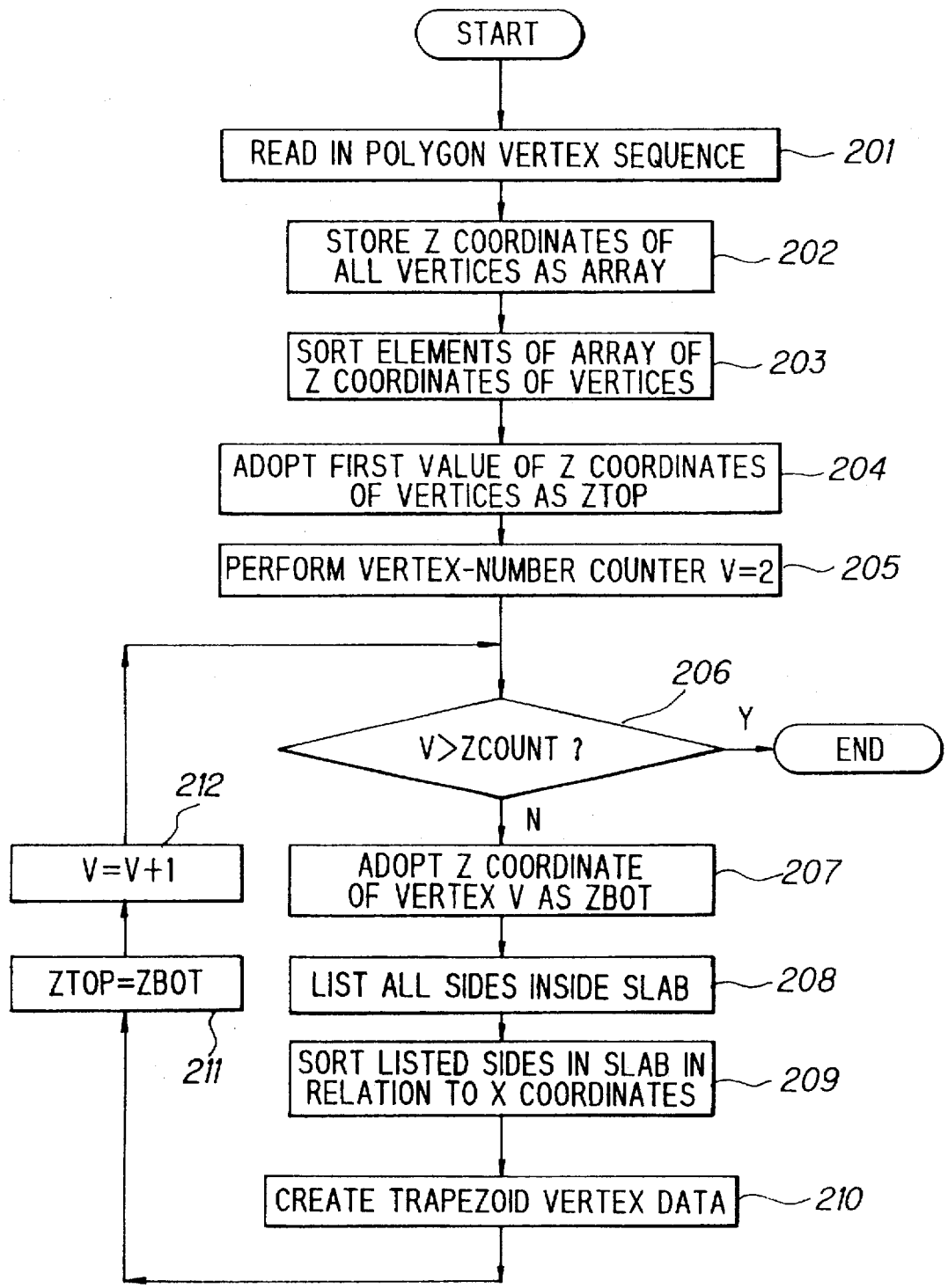
FIG. 8 is a processing flowchart of trapezoidal partitioning according to the second embodiment.

FIG. 8 is a processing flowchart of trapezoidal partitioning according to the invention which takes into consideration the case where intersection occurs at 2·n ($n \geq 2$) points. It should be noted that the area delimited by adjacent Z-axis intercept lines shall be referred to as a "slab".

Data indicative of the FIG. of an optical waveguide output by the CAD tool 1 (FIG. 2) dedicated to layout and stored on a memory medium is read in and the number of vertices is counted and designated by ZCOUNT (step 201). It should be noted that the FIG. 11 of the optical waveguide is approximated by a polygon and that the coordinates (vertex-sequence data) of the vertices A, B, ..., K constructing the polygon have been stored on the memory medium in order in the clockwise direction. Further, the coordinate axes are such that the Z axis is set as the direction of light propagation and the X axis is set perpendicular to the Z axis.

Next, the Z-axis coordinate of each vertex of the polygon is read and stored in memory (step 202) and the Z coordinates are sorted in ascending order (step 203). If sorting is finished, the first value of the Z coordinates of the vertices is made ZTOP (step 204) and a counter V of the number of vertices is made 2 (step 205).

Next, a check is performed to determine whether V>ZCOUNT holds (step 206). If this relation holds processing for trapezoidal partitioning is terminated. If V$\leq$COUNT holds, however, the V-th Z coordinate of the results of sorting is made ZBOT (step 207). This is followed by listing all sides, which construct the outline, present within the area (slab) delimited by two straight lines (Z-axis intercept lines) passing through ZTOp and ZBOT and lying perpendicular to the Z axis (step 208). For instance, in the example of the FIG. 11 of the optical waveguide of FIG. 7, two sides $AF_1$, $F_2K$ are present in the slab between the Z-axis intercept lines $41_1$, $41_2$; four sides $F_1B$, $B_1F$, $FJ_1$, $JF_2$ are present in the slab between the Z-axis intercept lines $41_2$, $41_3$; four sides $BE_1$, $EB_1$, $J_1G$, $G_1J$ are present in the slab between the Z-axis intercept lines $41_3$, $41_4$; and four sides $E_1C$, DE, GH, $IG_1$ are present in the slab between the Z-axis intercept lines $41_4$, $41_5$. Since the slab between the Z-axis intercept lines $41_1$, $41_2$ initially is the slab of interest, the two sides $AF_1$, $F_2K$ are listed at step 208. It should be noted that a side is specified by its two end points.

Next, the sides listed are then sorted in ascending order of the X coordinates (step 209). For example, of the two end points of a side, the end point having the smaller Z coordinate is selected. Sides are sorted based upon the smaller X coordinate of the selected end points.

Thereafter, two neighboring sides are combined (sides are combined so as not to overlap each other), a total of four end points of the two sides are recorded in an output file as the coordinates of the trapezoid. If other combinations of two other neighboring sides exist, then a total of four end points of the two sides are successively recorded in the output file as the coordinates of trapezoids in similar fashion (step 210). In the example of FIG. 7, the coordinates of vertices A, $F_1$, $F_2$, K are recorded in the output file as vertex-sequence data of the first trapezoid since the slab between the Z-axis intercepts $41_1$, $41_2$ is the slab of interest.

Next, ZBOT is made ZTOP (ZBOT$\rightarrow$ZTOP; step 211), the vertex counter V is counted up by one (V+1$\rightarrow$V; step 212) and the processing from step 206 onward is repeated.

In a case where the slab between the Z-axis intercept lines $41_2$, $41_3$ is the slab of interest, the four sides $F_1B$, $B_1F$, $FJ_1$, $JF_2$ reside within this slab, these are listed at step 208 and the sides are sorted at step 209 in the order $F_1B \rightarrow B_1F \rightarrow FJ_1 \rightarrow JF_2$. Next, at step 210, two neighboring sides are combined in the following manner: (side $F_1B$, side $B_1F$), (side $FJ_1$, side $JF_2$). The total of four end points ($F_1$, B, $B_1$, F) of the first two neighboring sides $F_1B$, $B_1F$ are output as the vertices of a trapezoid, and then the total of four end points (F, $J_1$, J, $F_2$) of the second two neighboring sides $FJ_1$, $JF_2$ are output as the vertices of a trapezoid.

If this arrangement is adopted, even in a case where the two adjacent straight lines $41_i$, $41_{i+1}$ each intersect the outline of the optical waveguide at 2·n ($n \geq 2$) points, FIG. data of an optical waveguide created by a program dedicated to layout can be converted to input data for simulating the waveguide characteristics of the optical waveguide automatically, and the efficiency at which optical waveguides are designed can be improved upon by exploiting the output data of the program dedicated to layout.

Figure 9:
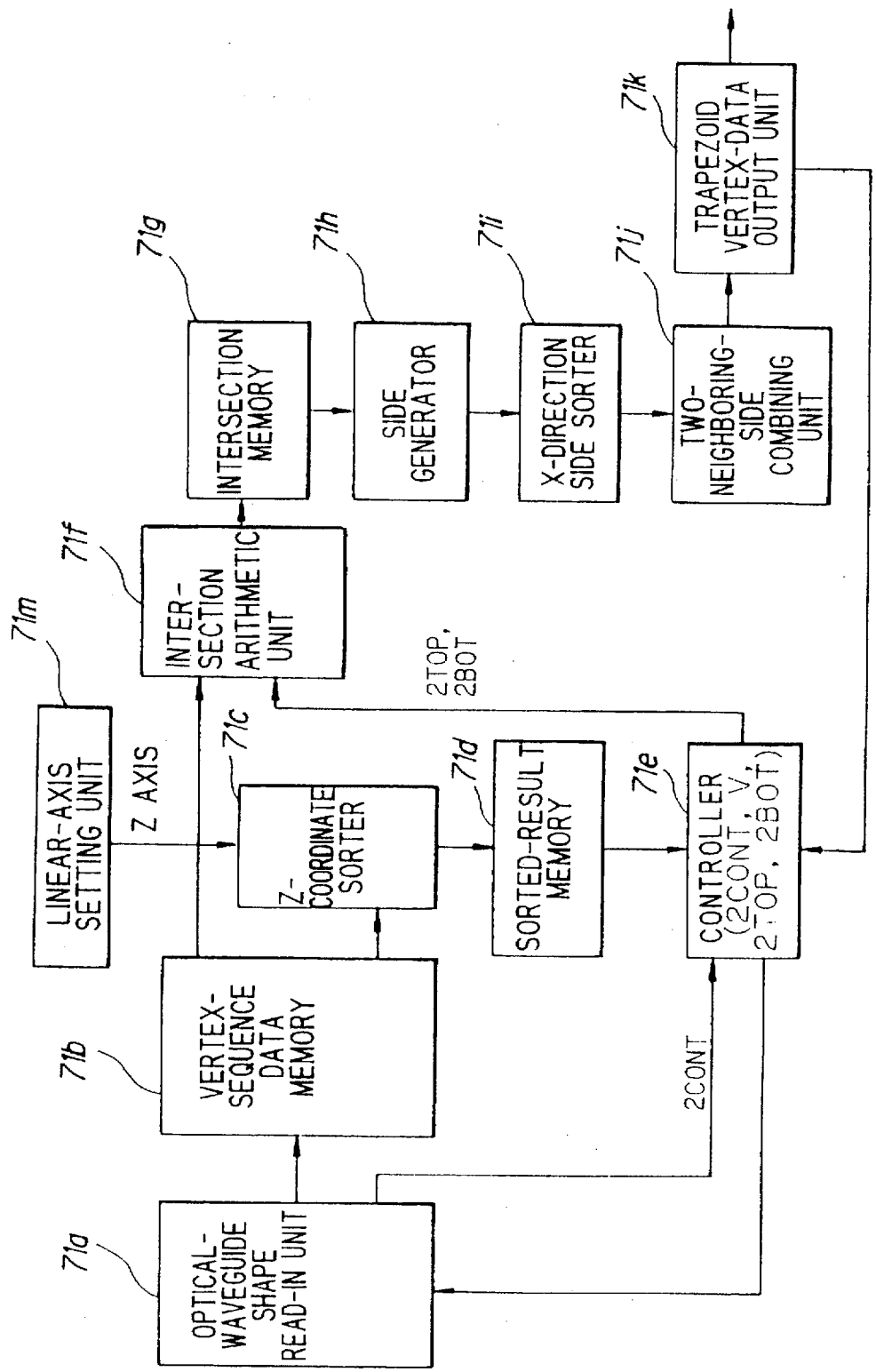
FIG. 9 is a block diagram of a trapezoidal partitioning apparatus according to the second embodiment.

(d-2) Construction of Trapezoidal Partitioning Apparatus According to the Second Embodiment FIG. 9 is a block diagram of a trapezoidal partitioning apparatus for realizing the trapezoidal partitioning processing of the second embodiment. Numeral 71a denotes an optical-waveguide FIG. read-in unit for reading in the figure data of an optical waveguide, counting the number of vertices and setting ZCOUNT, 71b a vertex-sequence data memory for storing the coordinates of the vertices constructing the FIG. of the optical waveguide, 71c a Z-coordinate sorter for reading the Z-axis coordinate of each vertex of the polygon and sorting the Z coordinates in ascending order, 71d a sorted-result memory for storing the results of sorting, and 71e a controller for managing the vertex count ZCOUNT, ZTOP, ZBOT and the vertex counter V and for performing overall control. Initially, the first value of the results of sorting is made ZTOP, the counter V for the number of vertices is made 2 (V=2) and the second value of the results of sorting is made ZBOT.

Numeral 71f denotes an intersection arithmetic unit for computing points of intersection between two straight lines (the Z-axis intercept lines), which pass through ZTOP and ZBOT and lie perpendicular to the set linear axis (the Z axis), and the outline of the optical waveguide, 71g an intersection memory for storing the coordinates of the points of intersection, 71h a side generator for generating and listing all sides, which construct the outline of the optical waveguide, present within the area (slab) delimited by two straight lines (Z-axis intercept lines) passing through ZTOP and ZBOT and lying perpendicular to the Z axis, 71i an X-direction side sorter for sorting the listed sides in the ascending order of the X coordinates, 71j a two-neighboring-side combining unit for combining two neighboring sides in such a manner that the sides will not overlap each other, and 71k a trapezoid vertex-data output unit for outputting a total of four end points of two neighboring sides as the vertices of a trapezoid and successively outputting a total of four end points of two other neighboring sides as the vertices of a trapezoid in the same manner. Numeral 71m denotes a linear-axis setting unit which specifies the linear axis (Z axis). This unit sets the linear axis (Z axis) 21 so as to lie perpendicular to the end facet for an incident optical beam 12 of the optical waveguide. That is, the linear axis is set in the direction in which light propagates.

The controller 71e instructs the optical-waveguide figure read-in unit 71a to read in the figure data of the optical waveguide. As a result, the optical-waveguide figure read-in unit 71a reads the vertex-sequence data constructing the figure of the optical waveguide from the memory medium, such as a magnetic tape, stores the vertex-sequence data in the memory 71b, identifies the vertex count VCOUNT and inputs this count to the controller 71e. The Z-coordinate sorter 71c reads the Z-axis coordinate of each vertex of the polygon, sorts them in ascending order and stores the results of sorting in the sorted-result memory 71d.

When sorting of the Z-axis coordinates is completed, the controller 71e takes the first value of the results of sorting, makes this value ZTOP, increments the vertex-count counter V to 2 (V=2), takes the second value of the results of sorting and makes this value ZBOT.

The coordinate arithmetic unit 71f computes points of intersection between two straight lines (the Z-axis intercept lines), which pass through ZTOp and ZBOT and lie perpendicular to the Z axis, and the outline of the optical waveguide, and stores these points in the intersection coordinate memory 71g. The side generator 71h generates and lists all sides which construct the outline of the optical waveguide delimited by the two Z-axis intercept lines and present within the slab. Thereafter, the X-direction side sorter 71i sorts the listed sides in ascending order of the X coordinates, and the two-neighboring-side combining unit 71j combines two neighboring sides in such a manner that the sides will not overlap each other. The trapezoid vertex-data output unit 71k outputs a total of four end points of two neighboring sides as the vertices of a trapezoid and successively outputs a total of four end points of two other neighboring sides as the vertices of a trapezoid in the same manner.

If output of vertex data of trapezoids constructed by all two neighboring sides is completed, the controller 71e takes ZBOT and makes it ZTOP (ZBOT→ZTOP) and counts up the vertex counter V by one (V+1→V). Next, the controller 71e checks to determine whether V>ZCOUNT holds. If it does, trapezoidal partitioning processing is terminated. If V≦ZCOUNT holds, the V-th Z coordinate of the results of sorting the Z coordinates is made ZBOT.

This is followed by using the new ZTOP, ZBOT to execute processing similar to that described above and then outputting the trapezoid vertex data.

(d-3) Verification of performance

Figure 10:
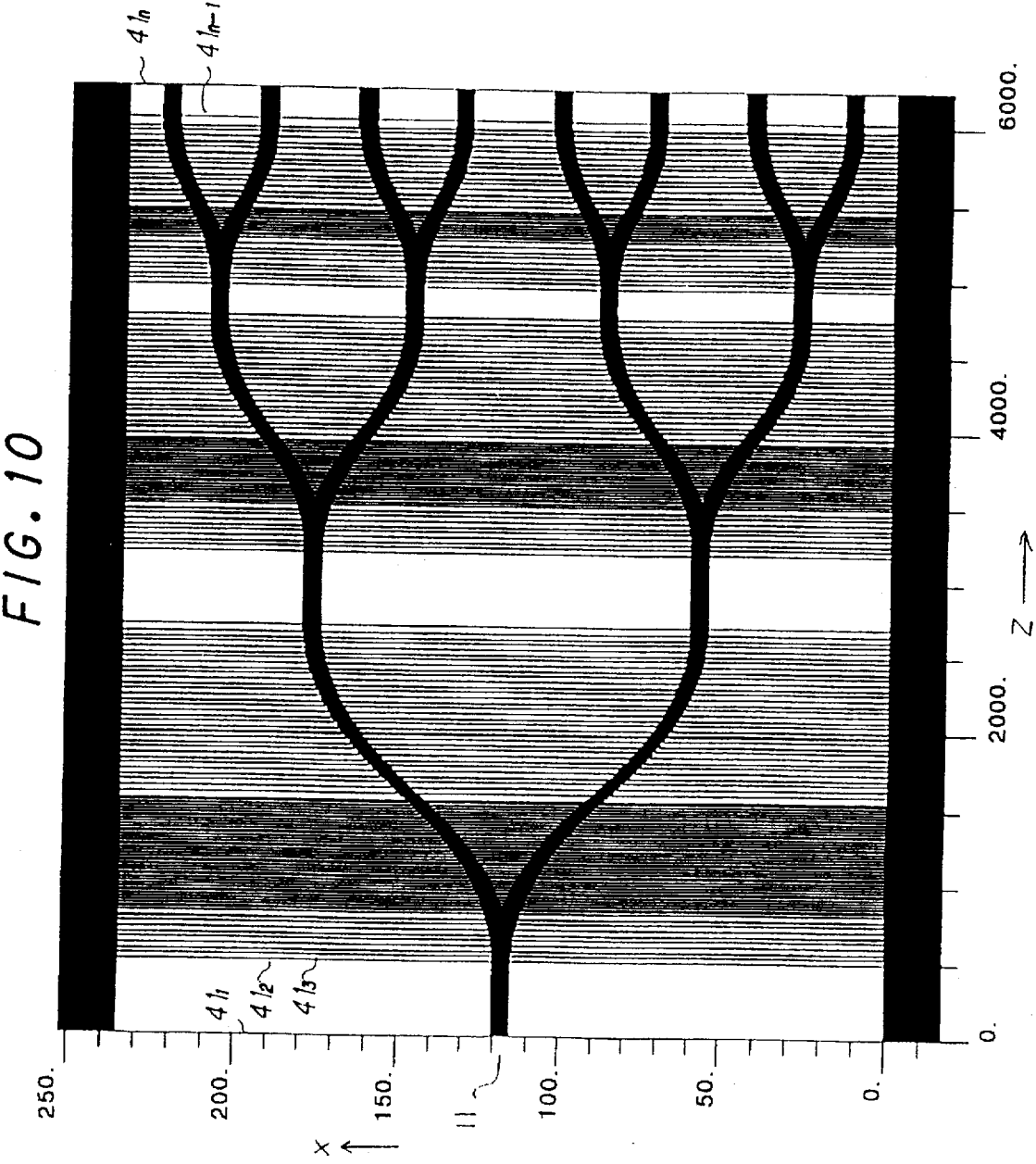
FIG. 10 is a diagram for describing an example of application of trapezoidal partitioning.

FIG. 10 is a diagram for describing a case in which the second embodiment of the invention is applied to an optical waveguide having one input and eight outputs. Numeral 11 in FIG. 10 denotes the FIG. of an optical waveguide which successively bifurcates into a total of eight branches. The horizontal axis is the Z axis and the vertical axis is the X axis. Since a large number of trapezoids become necessary in the curved portions of the optical-waveguide configuration, the density of the Z-axis intercept lines $41_i$ (i=1, 2, ... ) becomes high. The Z-axis intercept lines in the linear portions of the optical-waveguide configuration have a low density. Though approximately ten minutes is required for inputs to the optical-waveguide configuration 11, conversion to the data string of trapezoid vertices of the optical-waveguide configuration was completed in several tens of seconds.

FIG. 11 shows the results of simulating the characteristics of the waveguide by inputting the vertex-sequence data of the trapezoids, which have been obtained by the method of the invention, to the BPM analyzing tool 3 (FIG. 2). The intensity distribution of light and the degree of leakage of light are evident at a glance. The wavelength of incident light was 1.55 μm, the width of the waveguide was 6 μm, the bifurcation angle was 4°, and the effective refractive indices of the substrate and waveguide were 1.444 and 1.455, respectively. The total excess loss due to branching was found to be 0.5 dB. Thus, appropriate analytical results were obtained.

Figure 13:
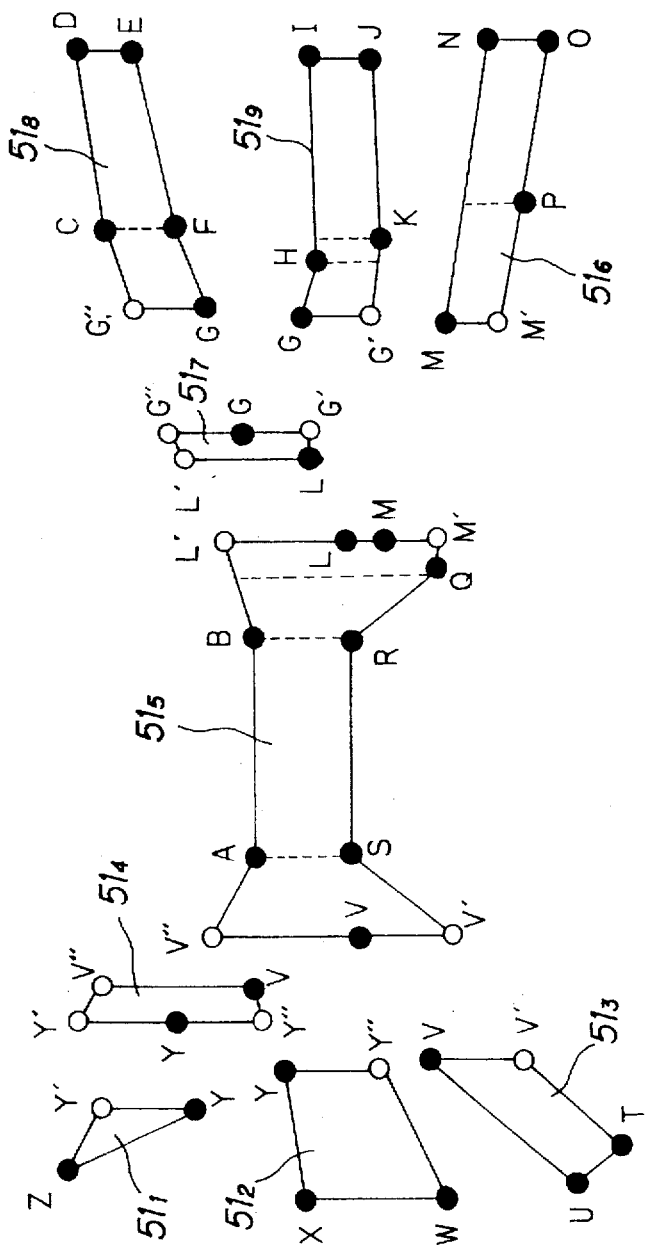
FIG. 13 is a diagram (part 2) for describing a third embodiment.

(e) Third Embodiment of Method of Trapezoidal Partitioning According to the Invention (e-1) Overview of the Third Embodiment FIGS. 12 and 13 are diagrams for describing a third embodiment of the method of trapezoidal partitioning according to the present invention.

As shown in FIG. 12, in a case where the optical-waveguide configuration 11 has concavities $61a$, $61b$, $61c$, $61d$ along the direction of the linear axis (Z axis), the optical-waveguide configuration is decomposed into convex polygons $51_1$~$51_9$ (FIGS. 12, 13), along one axis, not having concavities along the direction of the Z axis. Next, the processing for trapezoidal partitioning according to the first embodiment is applied to each of the decomposed convex polygons $51_1$~$51_9$ along the one axis to partition these polygons into groups of trapezoids (see the dashed lines in FIG. 13), and a data string of indicating the vertices of each trapezoid is output.

If this arrangement is adopted, even when the FIG. of the optical waveguide is such that it branches into a straight waveguide and a curved waveguide, the straight waveguide portion is not partitioned into trapezoids. Further, even if a polygon is a complicated one, the polygon is decomposed into a plurality of convex polygons along the direction of the one axis and trapezoidal partitioning is applied to each convex polygon along the one axis. As a result, processing for sorting vertices is executed in a short period of time and processing for sorting sides within a slab can be dispensed with, thus making it possible to shorten processing time.

(e-2) Processing for Trapezoidal Partitioning According to the Third Embodiment

Figure 14:
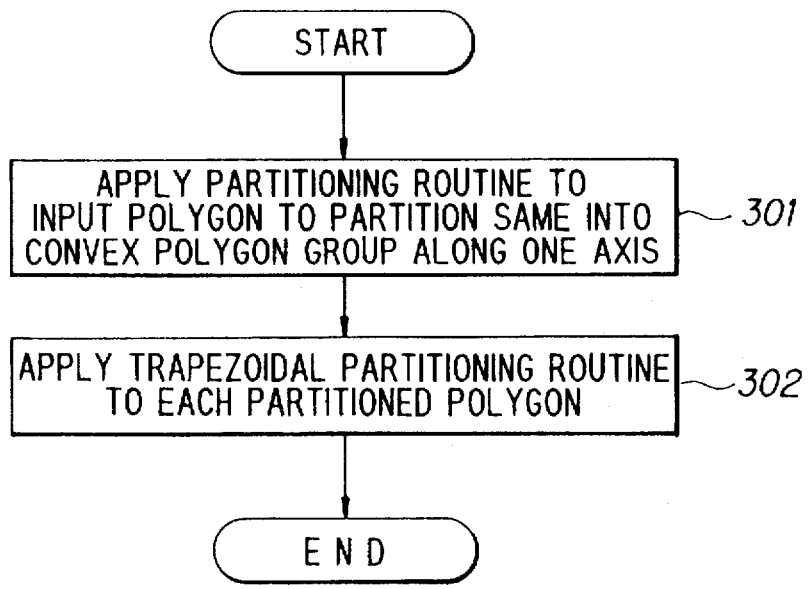
FIG. 14 is a flowchart of a main routine of processing for trapezoidal partitioning according to the third embodiment.

FIG. 14 is a general flowchart of processing for trapezoidal partitioning according to the third embodiment. The optical-waveguide configuration is decomposed into convex polygons along the direction of one axis, wherein the polygons do not have convexities along the direction of the Z axis (301). Next, processing for trapezoidal partitioning is applied to each of the decomposed convex polygons along the one axis and a data string of the vertex data of each trapezoid is output (step 302).

The processing for partitioning into the polygons along one axis is performed by specifying the coordinates of vertices A~Z of the optical-waveguide configuration 11 (FIG. 12) by vertex-sequence data arrayed in order in the clockwise direction, obtaining vertices (internal cusps) G, V, X of concave portions and a pair of serial internal cusps LM along the Z axis in the optical-waveguide configuration using the vertex-sequence data of the optical-waveguide configuration, and decomposing the optical-waveguide configuration 11 into the convex polygons $51_1$~$51_9$ along one axis by straight lines passing through the internal cusps and a pair of serial internal cusps and lying perpendicular to the Z axis.

Figure 15:
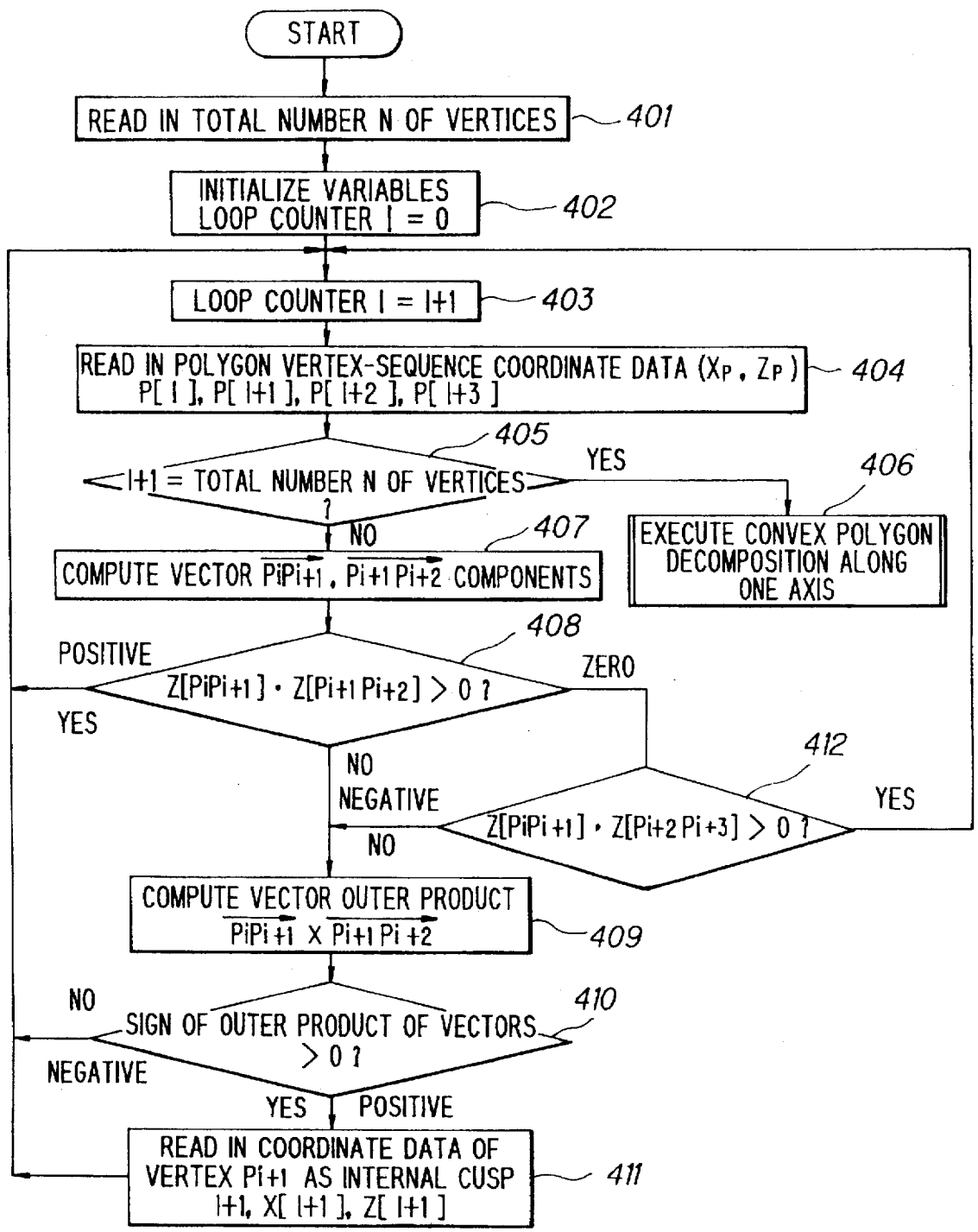
FIG. 15 is a processing flowchart for detecting internal cusps and a pair of serial internal cusps.

(e-3) Processing for Detecting Internal Cusps and a Pair of Serial Internal Cusps FIG. 15 is a flowchart of processing for detecting internal cusps and a pair of serial internal cusps.

First, data indicative of the figure of an optical waveguide output by the CAD tool 1 dedicated to layout and stored on a memory medium is read in and the number N of vertices is discriminated and stored. Further, a loop counter I is initialized (steps 401, 402). It should be noted that the FIG. 11 (FIG. 12) of the optical waveguide is approximated by a polygon and that the coordinates (vertex-sequence data) of the vertices A, B, ..., Z constructing the polygon have been stored on the memory medium in order in the clockwise direction. Further, the coordinate axes are such a linear axis (the Z axis) is set as the direction of light propagation and the X axis is set perpendicular to the Z axis.

Next, the loop counter I is counted up (I+1→I; step 403) and the coordinates of the I-th, (I+1)th, (I+2)th and (I+3)th vertices P[I], P[I+1], P[I+2], P[I+3] are read in from memory (step 404). It should be noted that the I-th vertex is henceforth denoted by P[I] or Pi.

It is then determined whether I+1 is equal to the total number N of vertices (step 405). If the two are equal, then processing for detecting internal cusps and a pair of serial internal cusps is terminated and processing, described below, for partitioning into convex polygons along the direction of one axis is executed (step 406).

If I+1<N holds, then a first vector $P_iP_{i+1}$ and a second vector $P_{i+1}P_{i+2}$ are computed (step 407). Next, it is determined whether the signs of the Z-axis components $Z[P_iP_{i+1}]$, $Z[P_{i+1}P_{i+2}]$ of the first and second vectors are positive, negative or zero (step 408). If the signs are identical, i.e., if $[P_iP_{i+1}] \times Z[P_{i+1}P_{i+2}]$ is positive, then the vertex P[I+1] is not an internal cusp and does not construct a pair of serial internal cusps. The program therefore returns to step 403, I is counted up and processing from this point onward is repeated.

Figure 16A:
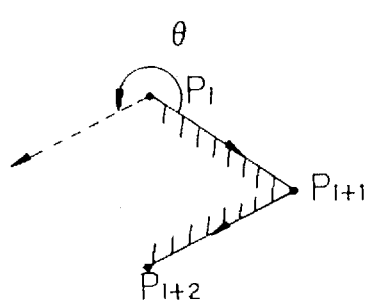
FIG. 16 is a diagram for describing external cusps.

However, if the signs of the Z-axis components $Z[P_iP_{i+1}]$, $Z[P_{i+1}P_{i+2}]$ of the first and second vectors are different, i.e., if $[P_iP_{i+1}] \times Z[P_{i+1}P_{i+2}]$ is negative, the possibility of an internal cusp exists. Accordingly, the outer product of the first and second vectors is computed (step 409). Next, it is determined whether the outer product of the vectors is positive or not (step 410). If the outer product of the vectors is negative, then the vertex P[I+1] is not an internal cusp but, as shown in FIGS. 16(a), (b), is a point (an external cusp) at which the optical-waveguide configuration projects toward the outside. As a result, the program returns to step 403, I is counted up and processing is repeated from this point onward.

If the outer product of the vectors is positive, on the other hand, then the vertex P[I+1] is a vertex (internal cusp) of a concave portion of the optical-waveguide configuration 11. Accordingly, I+1 and the coordinates of the vertex P[I+1] are written in memory as an internal cusp (step 411), the program returns to step 403, I is counted up and processing is repeated from this point onward.

Figure 16B:
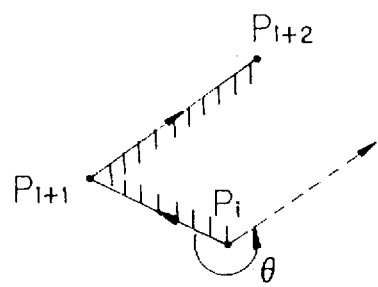
Figure 17A:
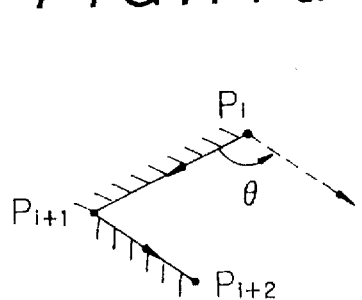
FIG. 17 is a diagram for describing internal cusps.
Figure 17B:
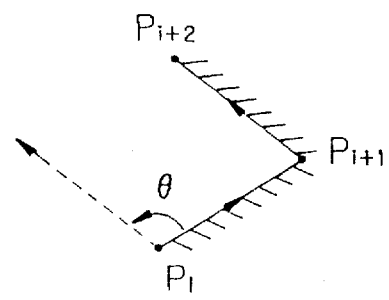
Figure 18:
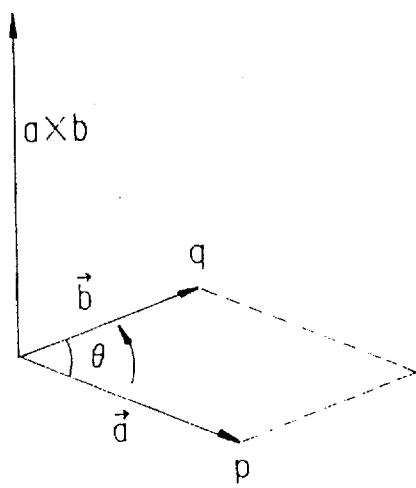
FIG. 18 is a diagram for describing outer product of vectors.

FIG. 18 is a diagram for describing the outer product of vectors. The outer product of vectors a, b is a vector that is perpendicular to the vectors a, b and has a magnitude equal to the area |a||b|sinθ of a parallelogram decided by these vectors. By convention, the sense of this vector is the direction (positive) of advance of a right-hand screw when the screw is turned through an angle of less than 180° from vector a to vector b. Accordingly, in a case where the vertex P[I+1] is an external cusp, as shown in FIG. 16, rotation from the first vector to the second vector is greater than 180° and, hence, the outer product of the vectors is negative. However, in a case where the vertex P[I+1] is an internal cusp, as shown in FIG. 17, rotation from the first vector to the second vector is less than 180° and, hence, the outer product of the vectors is positive.

In a case where $[P_iP_{i+1}] \times Z[P_{i+1}P_{i+2}]$ is zero at step 408, the Z coordinate of the second vector is zero and there is a possibility that the second vector is a side connected by a pair of serial internal cusps.

Figure 19A:
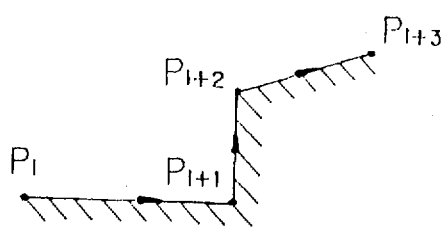
FIG. 19 is a diagram (part 1) for describing a pair of serial internal cusps.
Figure 19B:
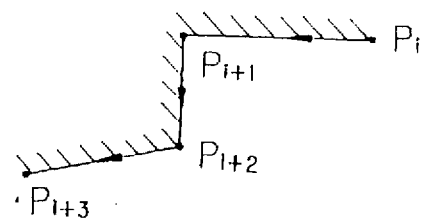
Figure 20A:
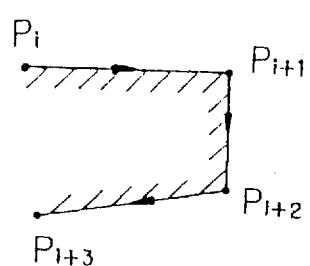
FIG. 20 is a diagram (part 2) for describing a pair of serial internal cusps.
Figure 20B:
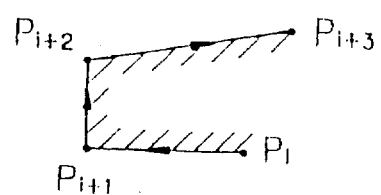

Accordingly, a third vector $P_{i+2}P_{i+3}$ is computed and it is determined whether the signs of the Z-axis components $Z[P_iP_{i+1}]$, $Z[P_{i+2}P_{i+3}]$ of the first and third vectors are positive or negative (step 412). If the signs are identical, then the FIG. is shown in FIGS. 19(a), (b). Since the second vector is not a side connected by a pair of serial internal cusps, the program therefore returns to step 403, I is counted up and processing from this point onward is repeated. If the signs differ, however, the outer product of the first and second vectors is computed (step 409) and then it is determined whether the outer product of the vectors is positive or not (step 410). If the outer product of the vectors is negative, then, as shown in FIGS. 20(a), (b), the second vector is a side at which the optical-waveguide configuration projects toward the outside. As a result, the program returns to step 403, I is counted up and processing is repeated from this point onward.

Figure 21A:
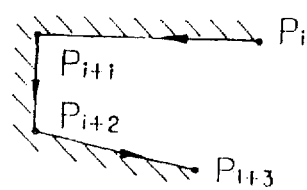
FIG. 21 is a diagram (part 3) for describing a pair of serial internal cusps.
Figure 21B:
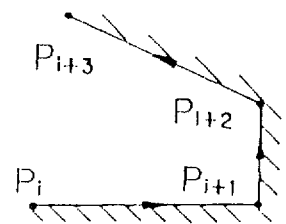

If the outer product of the vectors is positive, on the other hand, then the second vector constructs a side connected by a pair of serial internal cusps, as shown in FIGS. 21 (a), (b). Hence, the side $P_{i+1}P_{i+2}$ is written in memory as a side connected by a pair of serial internal cusps. In actuality, I+1 and the coordinates of $P_{i+1}$ are written in memory as an internal cusp (step 411), the program returns to step 403, I is counted up and processing is repeated from this point onward. Thereafter, the above-described processing is repeated to execute detection of all internal cusps and a pair of serial internal cusps of the optical-waveguide configuration.

(e-4) Processing for Convex Polygon Decomposition Along One Axis

Figure 22:
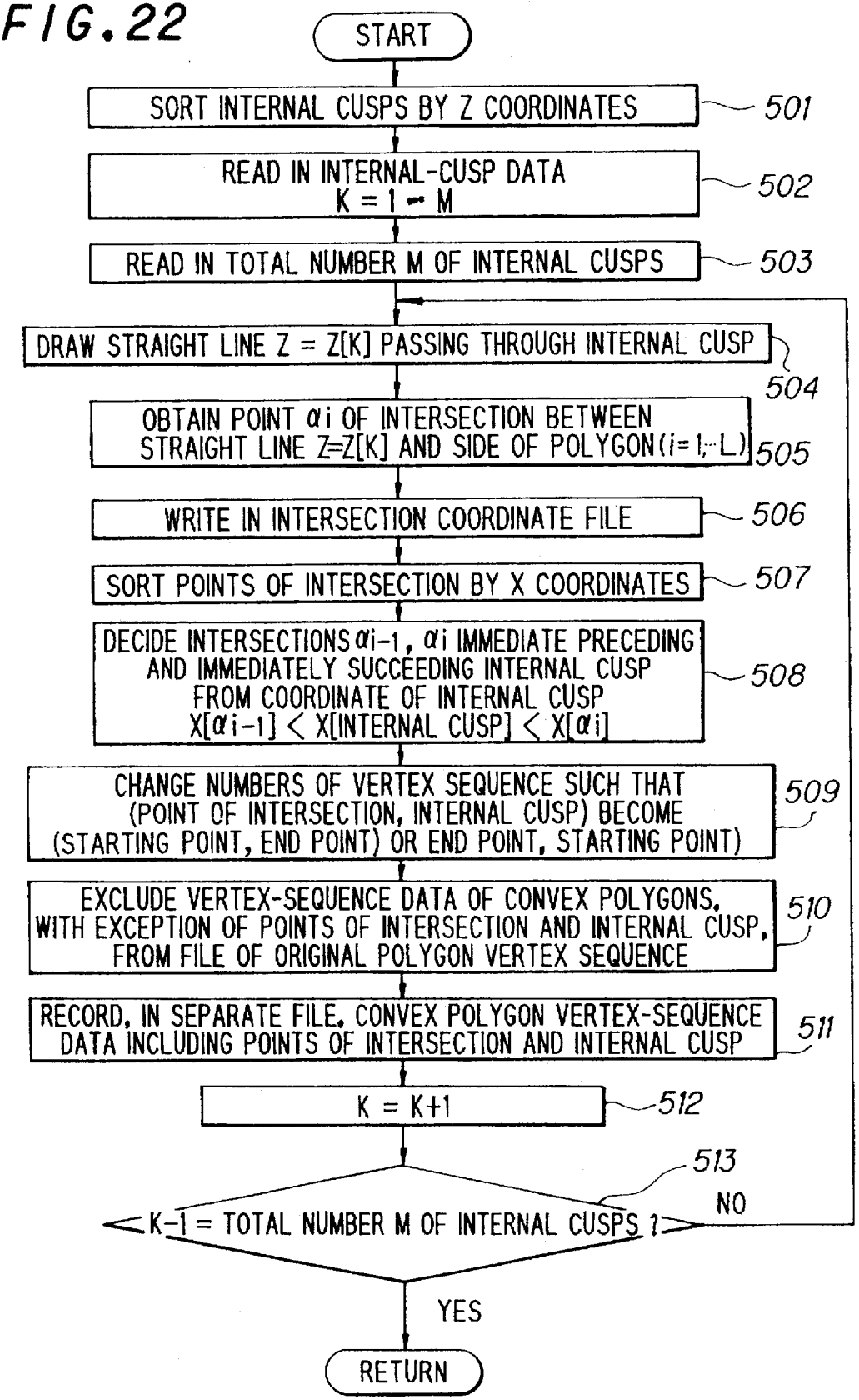
FIG. 22 is a flowchart of processing for decomposition of a convex polygon along the direction of one axis.

FIG. 22 is a flowchart of processing for convex polygon decomposition along one axis.

If detection of internal cusps and pairs of serial internal cusps is finished, the figure of the optical waveguide is decomposed into convex polygons along one axis. It should be noted that the pairs of serial internal cusps have been stored in memory as internal cusps.

First, sorting processing is executed to rearrange the internal cusps, which have been stored in memory, in ascending order of the Z-axis coordinates (step 501). Next, the internal cusps are read in according to the sorted order and the total number M of the internal cusps is stored (steps 502, 503).

The operation 1→K is performed, a straight line (Z-axis intercept) Z[K] passing through the K-th internal cusp and lying perpendicular to the Z axis is drawn (step 504), a point $\alpha_i$ (i=1, 2, ... L) of intersection between the Z-axis intercept line and the outline of the optical waveguide (the side of the polygon) is computed and the point of intersection is written in an intersection coordinate file (steps 505, 506).

This is followed by sorting the points of intersection according to their X coordinates and using the X coordinate of the K-th internal cusp to decide points $\alpha_{i-1}$, $\alpha_i$ of intersection immediately preceding and immediately succeeding the internal cusp (steps 507, 508). The FIG. of the optical waveguide is partitioned into two (first and second) convex polygons along one axis and a remaining polygon by a line segment connecting the point $\alpha_{i-1}$ of intersection and the K-th internal cusp and a line segment connecting the point $\alpha_i$ of intersection and the K-th internal cusp.

Next, the numbers of the sequence of vertices of the convex polygons along the one axis are arrayed in the clockwise direction (or the counter-clockwise direction if desired) in such a manner that the point $\alpha_{i-1}$ of intersection and the K-th internal cusp become the starting point and end point, or the end point and starting point, of the first convex polygon along the one axis. Similarly, the numbers of the sequence of vertices of the convex polygons along the one axis are arrayed in the clockwise direction in such a manner that the point $\alpha_i$ of intersection and the K-th internal cusp become the starting point and end point, or the end point and starting point, of the second convex polygon along the one axis (step 509).

Thereafter, the polygon obtained by eliminating the first and second convex polygons along one axis from the FIG. of the optical waveguide is regarded as being the FIG. of a new optical waveguide and the vertex-sequence data of the figure of this optical waveguide is arrayed in the clockwise direction. In actuality, the vertex sequence of the FIG. of the new optical waveguide is created by excluding the vertex sequence which constructs the first and second convex polygons along one axis from the vertex sequence of the figure of the original optical waveguide (though it should be noted that the points $\alpha_{i-1}$, $\alpha_i$ of intersection and the K-th internal cusp are not excluded) (step 510).

The vertex-sequence data of the first and second convex polygons along one axis is written in a file (step 511). Next, K is incremented (K+1→K; step 512) and it is determined whether K−1 is equal to the total number M of internal cusps (step 513). In a case where K−1<M holds, the processing from step 504 onward is repeated with regard to the new optical-waveguide FIG. created at step 510. In a case where K−1=M holds, processing for decomposition of convex polygons along one axis is ended.

Thereafter, each decomposed convex polygon along the one axis is partitioned into a group of trapezoids by applying the trapezoidal partitioning processing of the first embodiment, and the data string of the vertices of each trapezoid is output.

Thus, if the figure of an optical waveguide is decomposed into a plurality of convex polygons along the direction of one axis and trapezoidal partitioning processing is applied to each decomposed convex polygon along the one axis, the straight waveguide portion of an optical waveguide having a figure which branches into a straight waveguide and a curved waveguide is not partitioned into trapezoids. Further, when a polygon is a complicated one, the polygon is decomposed into a plurality of convex polygons along the direction of one axis and trapezoidal partitioning is applied to each convex polygon along the one axis. As a result, processing for sorting vertices is executed in a short period of time and processing for sorting sides inside a slab, as in the prior art, is unnecessary. This makes it possible to shorten processing time.

Figure 23:
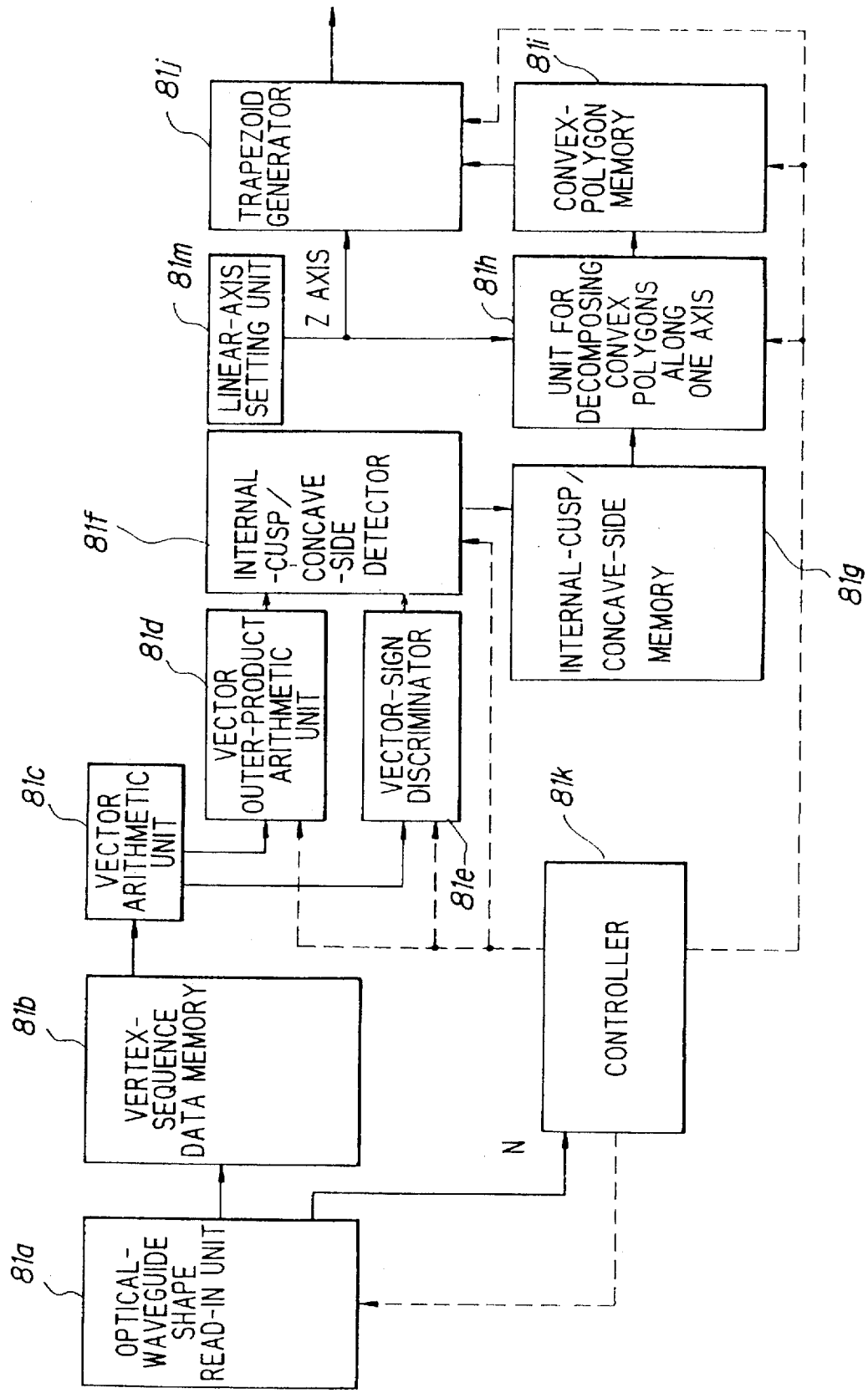
FIG. 23 is a block diagram of a trapezoidal partitioning apparatus according to the third embodiment.
Figure 24:
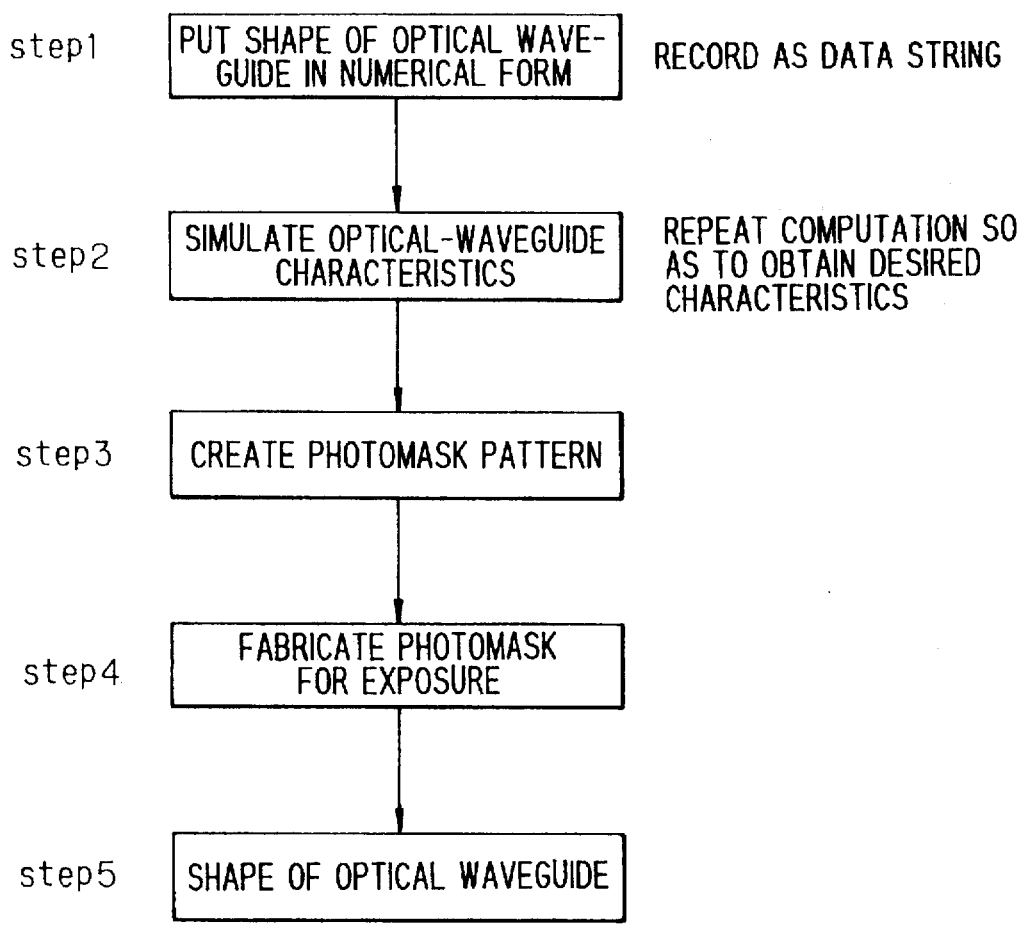
FIG. 24 is a diagram for describing a procedure for designing an optical waveguide.
Figure 25A:
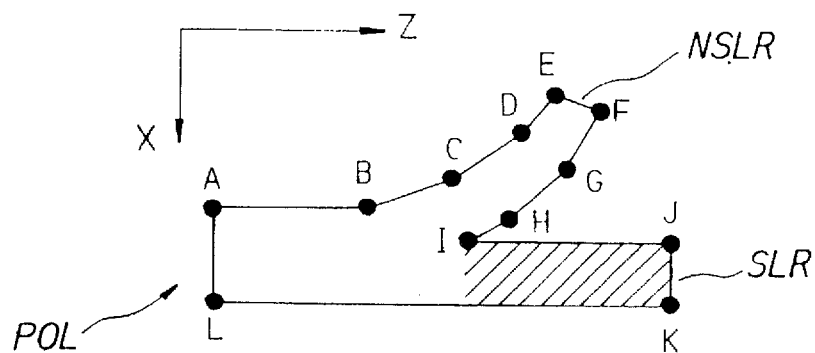
FIG. 25(a), (b) is a diagram for describing problems encountered in the prior art.
Figure 25B:
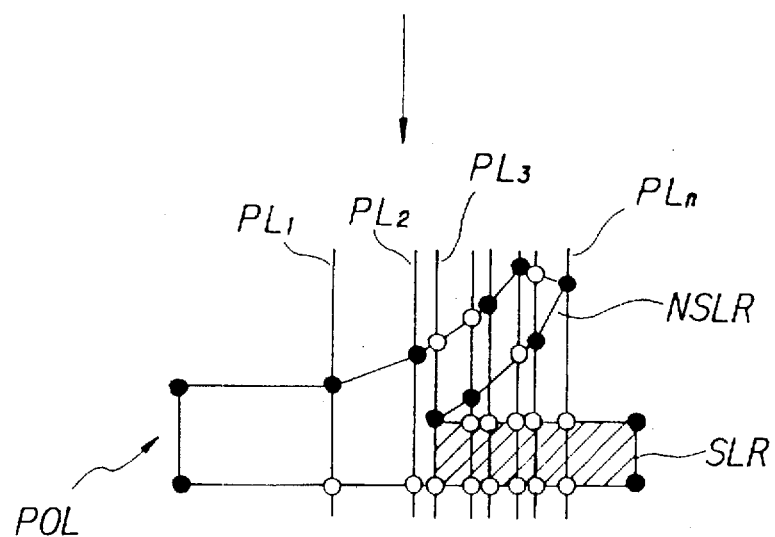

(e-5) Construction of Trapezoidal Partitioning Apparatus According to the Third Embodiment FIG. 23 is a block diagram of a trapezoidal partitioning apparatus for realizing the trapezoidal partitioning processing of the third embodiment. Numeral 81a denotes an optical-waveguide figure read-in unit for reading in the figure data of an optical waveguide, 81b a vertex-sequence data memory for storing the coordinates of the vertices constructing the figure of the optical waveguide, 81c a vector arithmetic unit for computing first, second and third vectors using consecutive vertices P[I], P[I+1], P[I+2], P[I+3] of the optical-waveguide figure, 81d a vector outer-product arithmetic unit for computing the outer product of the first and second vectors, 81e a vector-sign discriminator for discriminating the signs (inclusive of zero) of the Z-axis components of two vectors of interest, 81f an internal-cusp/side connected by a pair of serial internal cusps detector for detecting internal cusps and a pair of serial internal cusps of the figure of an optical waveguide, 81g an internal-cusp/side connected by a pair of serial internal cusps memory, 81h a unit for decomposing convex polygons along one axis, 81i a convex-polygon memory for storing vertex-sequence data of decomposed convex polygons along one axis, 81j a trapezoid generator for applying trapezoidal partitioning processing of the first embodiment to each of the convex polygons along one axis to partition these convex polygons into trapezoids, and outputting the data string of the vertices of each trapezoid, 81k a controller for performing overall control, and 81m a linear-axis setting unit for specifying a linear axis. The controller sets the linear axis (Z axis) 21 so as to lie perpendicular to the end facet for an incident optical beam of the optical waveguide. That is, the linear axis is set in the direction in which light propagates.

The trapezoidal partitioning apparatus is also capable of being realized by hardware of microcomputer construction. Though the present invention has been described on the basis of embodiments, the invention can be modified in various ways in accordance with the gist of the invention described in the claims. These modifications are not excluded from the invention.

Thus, in accordance with the present invention, figure data of an optical waveguide as created by a program dedicated to layout can be automatically converted to input data for simulating the characteristics of the optical waveguide. The efficiency of optical-waveguide designing can be raised by exploiting the output data of the program dedicated to layout.

Further, since a format for recording optical-waveguide figure data already standardized can be utilized, it is possible to exploit conventional software resources and a universal system for designing optical waveguides can be realized.

Furthermore, in accordance with the present invention, even if two adjacent Z-axis intercept lines intersect the outline of an optical waveguide at 2·n (n≧2) points each, figure data of an optical waveguide as created by a program dedicated to layout can be automatically converted to input data for simulating waveguide characteristics of the optical waveguide. The efficiency of optical-waveguide designing can be raised by exploiting the output data of the program dedicated to layout.

Further, according to the present invention, the figure of an optical waveguide is decomposed into a plurality of simple convex polygons along one axis and trapezoidal partitioning processing is applied to each of the decomposed convex polygons along the axis. As a result, even conversion of more complicated figure data requiring accuracy, as in the case of a waveguide having multiple branches, can be carried out efficiently and without error.

Furthermore, in accordance with the invention, the figure of an optical waveguide is decomposed into a plurality of simple convex polygons along one axis and trapezoidal partitioning processing is applied to each of the decomposed convex polygons along the axis. As a result, if the figure of the optical waveguide branches into a straight waveguide and a curved waveguide, the straight waveguide portion is not partitioned into trapezoids.

Furthermore, in accordance with the invention, even if the figure of an optical waveguide is a complicated polygon, the figure is decomposed into a plurality of simple convex polygons along one axis and trapezoidal partitioning processing is applied to each of the decomposed convex polygons along the axis. As a result, the number of vertices of convex polygons along one axis is reduced and processing for sorting the vertices can be executed in a short period of time. Moreover, processing for sorting sides inside a slab, as in the prior art, is unnecessary. This makes it possible to shorten processing time.

Furthermore, by applying the present invention to design of an optical waveguide requiring a large number of photomask patterns (layer patterns) for exposure, which design is difficult to realize in the prior art owing to the enormous labor involved, it is possible to reduce the labor required for design. It is also possible to analyze a complicated structure, such as an optical waveguide with graded index.

What is claimed is:

1. A trapezoidal partitioning method for partitioning a FIG. of an optical waveguide approximated by a polygon into trapezoids, comprising:

specifying the FIG. of said optical waveguide by vertex-sequence data;

setting a prescribed linear axis in a direction of light propagation so that said prescribed linear axis is perpendicular to an end facet for an incident optical beam of the optical waveguide;

obtaining vertices of concave portions forming internal cusps in the direction of said linear axis and a pair of adjacent concave points lying in the direction perpendicular to said linear axis in the FIG. of the optical waveguide using the vertex-sequence data of the figure of the optical waveguide;

decomposing the figure of the optical waveguide into convex polygons which do not have concavities in a direction of said linear axis by straight lines passing through said internal cusps to said adjacent concave points and lying perpendicular to said linear axis; and partitioning each of the decomposed convex polygons into trapezoids having first and second sides thereof lying perpendicular to said prescribed linear axis.

2. A trapezoidal partitioning method according to claim 1, wherein said vertex-sequence data is arrayed in order, starting from a prescribed vertex, in the clockwise or counter-clockwise direction along an outline of the optical waveguide.

3. A trapezoidal partitioning method according to claim 2, wherein when signs of components, along said linear axis, of a first vector from a vertex immediately preceding a vertex of interest to the vertex of interest and a second vector from the vertex of interest to a vertex immediately succeeding the vertex of interest differ from each other and a vector outer product of the first and second vectors is positive, the vertex of interest is detected as an internal cusp.

4. A trapezoidal partitioning method according to claim 2, wherein a vector from a vertex immediately preceding a vertex of interest to the vertex of interest is designated by a first vector, a vector from the vertex of interest to a vertex immediately succeeding the vertex of interest is designated by a second vector and a vector from the vertex immediately succeeding the vertex of interest to the next vertex is designated by a third vector, and when a component of the second vector along the linear axis is zero, signs of components of the first vector and the third vector along said linear axis differ from each other and a vector outer product of the first and second vector is positive, a pair of points consisting of the vertex of interest and the immediately succeeding vertex are detected as said adjacent concave points.

5. A trapezoidal partitioning apparatus for partitioning a figure of an optical waveguide approximated by a polygon into trapezoids, the apparatus comprising:

means for specifying the figure of said optical waveguide by vertex-sequence data, means for decomposing the figure of said optical waveguide into convex polygons, which do not have concavities in a direction of a prescribed linear axis in a direction of light propagation so that said prescribed linear axis is perpendicular to an end facet for an incident optical beam of the optical waveguide, means for partitioning the convex polygons into trapezoids by a group of straight lines passing through vertices of the convex polygons and lying perpendicular to said linear axis;

means for outputting a set of trapezoid vertex-sequence data for each trapezoid which is obtained by said partitioning and has first and second sides thereof lying perpendicular to said prescribed linear axis;

wherein said decomposing means includes:

means for obtaining vertices of concave portions forming internal cusps in the direction of the prescribed linear axis and a pair of adjacent concave points lying in a direction perpendicular to said linear axis in the figure of the optical waveguide using the vertex-sequence data of the figure of the optical waveguide, and means for decomposing the figure of the optical waveguide into convex polygons by straight lines passing through said internal cusps to said adjacent concave points and lying in the direction perpendicular to said linear axis.

6. A trapezoidal partitioning apparatus according to claim 5, further comprising:

means for computing a vector outer product of a first vector from a vertex immediately preceding a vertex of interest to the vertex of interest and a second vector from the vertex of interest to a vertex immediately succeeding the vertex of interest;

means for comparing signs of components, along said linear axis, of the first and second vectors; and means for detecting the vertex of interest as an internal cusp when the signs of the components, along said linear axis, of the first and second vectors differ and said vector outer product is positive.

7. A trapezoidal partitioning apparatus according to claim 5, further comprising:

means for computing a vector outer product of a first vector from a vertex immediately preceding a vertex of interest to the vertex of interest and a third vector from a vertex immediately succeeding the vertex of interest to a next vertex;

means for comparing signs of components, along said linear axis, of said first vector and said third vector; and means for detecting a pair of points consisting of the vertex of interest and the vertex immediately succeeding the vertex of interest as said adjacent concave points when the component, along said linear axis, of a second vector from the vertex of interest to the vertex immediately succeeding the vertex of interest is zero said vector outer product is positive and signs of components of the third vector and the first vector along said linear axis differ from each other.

* * * * *